(12) United States Patent
Shindo

(10) Patent No.: US 7,742,382 B2
(45) Date of Patent: Jun. 22, 2010

(54) LASER CONVERGING APPARATUS, OPTICAL PICKUP DEVICE AND OPTICAL DISC RECORDING/REPRODUCTION APPARATUS

(75) Inventor: Hiroyuki Shindo, Tokyo (JP)

(73) Assignees: Sanyo Electric Co., Ltd., Osaka (JP); Sanyo Optec Design Co., Ltd., Tokyo (JP)

( * ) Notice: Subject to any disclaimer, the term of this patent is extended or adjusted under 35 U.S.C. 154(b) by 723 days.

(21) Appl. No.: 11/427,687

(22) Filed: Jun. 29, 2006

(65) Prior Publication Data
US 2007/0002716 A1 Jan. 4, 2007

(30) Foreign Application Priority Data
Jul. 1, 2005 (JP) ............................. 2005-194311

(51) Int. Cl.
*G11B 7/135* (2006.01)
(52) U.S. Cl. .............................. 369/112.16; 369/112.17
(58) Field of Classification Search ............ 369/112.16, 369/112.17
See application file for complete search history.

(56) References Cited

U.S. PATENT DOCUMENTS

| | | | |
|---|---|---|---|
| 6,160,783 A | | 12/2000 | Tsuchiya et al. |
| 6,594,042 B2 * | | 7/2003 | Asada et al. .................. 359/15 |
| 2001/0040854 A1 * | | 11/2001 | Lee et al. ................ 369/112.17 |
| 2004/0114494 A1 * | | 6/2004 | Mizuno et al. ......... 369/112.17 |
| 2007/0053274 A1 * | | 3/2007 | Yoo et al. .............. 369/112.16 |

FOREIGN PATENT DOCUMENTS

| JP | 796431 | 4/1995 |
|---|---|---|
| JP | 2002-184026 | 6/2002 |

(Continued)

OTHER PUBLICATIONS

Haruki Tokumaru, Fumihiko Yokow, Mitsuru Irie, "Zukai DVD Tokuhon" Textbook, p. 115, Ohmsha, Dec. 2003.

(Continued)

*Primary Examiner*—Van N Chow
(74) *Attorney, Agent, or Firm*—Fish & Richardson P.C.

(57) ABSTRACT

A laser converging apparatus is disclosed that comprises a polarizing hologram element having a first area defined by a numerical aperture corresponding to a thickness of a first protective layer of a first disk medium and a second area inside the first area, the second area defined by a numerical aperture corresponding to a thickness of a second protective layer (> the thickness of the first protective layer) of a second disk medium, the second area having a hologram pattern for transmitting first laser light linearly polarized in a first direction without diffracting the first laser light while diffracting and transmitting second laser light that is linearly polarized in a second direction crossing the first direction at right angles, the second laser light having the same wavelength as the first laser light; an objective lens having the numerical aperture corresponding to the thickness of the first protective layer, the objective lens converging the first laser light having passed through the first area including the second area onto an information surface on one side of the first protective layer, the objective lens converging the second laser light having passed through the second area onto an information surface on one side of the second protective layer; and a holder that holds the polarizing hologram element and the objective lens.

6 Claims, 17 Drawing Sheets

FOREIGN PATENT DOCUMENTS

| | | |
|---|---|---|
| JP | 14-260272 | 9/2002 |
| JP | 2004326858 A | 11/2004 |
| JP | 2006134502 A | 5/2006 |
| JP | 2006172605 A | 6/2006 |
| JP | 2006216142 A | 8/2006 |
| JP | 2006309807 A | 11/2006 |
| WO | WO9848416 A1 | 10/1998 |

OTHER PUBLICATIONS

Japanese Office Action for Application No. 2005-194311 dated Mar. 16, 2010, 5 pages.

* cited by examiner

LASER CONVERGING APPARATUS, OPTICAL PICKUP DEVICE AND OPTICAL DISC RECORDING/REPRODUCTION APPARATUS

CROSS-REFERENCE TO RELATED APPLICATIONS

This application claims the benefit of priority to Japanese Patent Application No. 2005-194311, filed Jul. 1, 2005 in Japan, of which full contents are incorporated herein by reference.

BACKGROUND OF THE INVENTION

1. Field of the Invention

The present invention relates to a laser converging apparatus, an optical pickup device, and an optical disk recording/reproducing apparatus.

2. Description of the Related Art

An optical pickup device has been in popular use, which device includes a semiconductor laser that emits laser light of different wavelengths (780 to 790 nm for CD; 650 to 660 nm for DVD) onto optical disk media having different protective layer thicknesses, such as a CD (Compact Disc) with a protective layer of 1.2 mm thick and a DVD (Digital Versatile Disc) with a protective layer of 0.6 mm thick, and an objective lens usable for both optical disk media. This optical pickup device corrects a spherical aberration caused by the difference between the protective layer thicknesses, utilizing the difference between the wavelengths, to enable recording and reproduction on each optical disk medium.

These days, however, newly proposed optical disk media have emerged. These media have respective different protective layer thicknesses, such as a Blu-ray Disc (registered trademark) with a protective layer of 0.075 to 0.1 mm thick and an HD DVD (High Definition DVD) with a protective layer of 0.6 mm thick, and are capable of recording operation at higher density than CDs or DVDs. For the Blu-ray Disc, such an optical pickup device is used that it includes a semiconductor laser that emits blue-violet laser light having a wavelength of 400 to 410 nm and an objective lens having a numerical aperture (hereinafter referred to as NA) of 0.85. For the HD DVD, such an optical pickup device is used that it includes a semiconductor laser that emits the blue-violet laser light having the same wavelength as that for the Blu-ray Disc and an objective lens having an NA of 0.65. Individual optical pickup devices, therefore, are employed for the Blu-ray Disc and HD DVD, respectively.

These conventional optical pickup devices are, for example, disclosed in JP-A No. 14-184026 and described on page 115 of *DVD Textbook* by Haruki Tokumaru, Fumihiko Yokokawa, and Mitsuru Irie.

Recoding and reproducing on both Blu-ray Disc and HD DVD, however, requires individual pickup devices compatible respectively with the Blu-ray Disc and HD DVD. This raises a problem of higher cost, larger size, and heavier weight of pickup devices. The same problem happens in an optical disk recording/reproducing apparatus into which the optical pickup devices are incorporated. Besides, applying the blue-violet laser light of the same wavelengths to Blu-ray Disc and HD DVD makes impossible the employment of the conventional method utilizing the differences between wavelengths, thus makes difficult manufacturing of an optical pickup device that can be used for both Blu-ray Disc and HD DVD.

SUMMARY OF THE INVENTION

In order to solve the above problem, a major aspect of the present invention provides a laser converging apparatus comprising a polarizing hologram element having a first area defined by a numerical aperture corresponding to a thickness of a first protective layer of a first disk medium and a second area inside the first area, the second area defined by a numerical aperture corresponding to a thickness of a second protective layer (> the thickness of the first protective layer) of a second disk medium, the second area having a hologram pattern for transmitting first laser light linearly polarized in a first direction without diffracting the first laser light while diffracting and transmitting second laser light that is linearly polarized in a second direction crossing the first direction at right angles, the second laser light having the same wavelength as the first laser light; an objective lens having the numerical aperture corresponding to the thickness of the first protective layer, the objective lens converging the first laser light having passed through the first area including the second area onto an information surface on one side of the first protective layer, the objective lens converging the second laser light having passed through the second area onto an information surface on one side of the second protective layer; and a holder that holds the polarizing hologram element and the objective lens.

According to the present invention there can be provided a laser converging apparatus, an optical pickup device, and an optical disk recording/reproducing apparatus adaptable to optical disk media having different protective layer thicknesses using the same wavelength of laser light.

BRIEF DESCRIPTION OF THE DRAWINGS

For better understanding of the present invention and its advantages, the following description will be given for close reference, together with the attached drawings.

DETAILED DESCRIPTION OF THE INVENTION

The description given by this specification and the drawings attached thereto explain at least the following matters.

First Embodiment

=An Example of the Overall Configuration of an Optical Pickup Device to which a Laser Converging Apparatus Applies=

Figure 1:
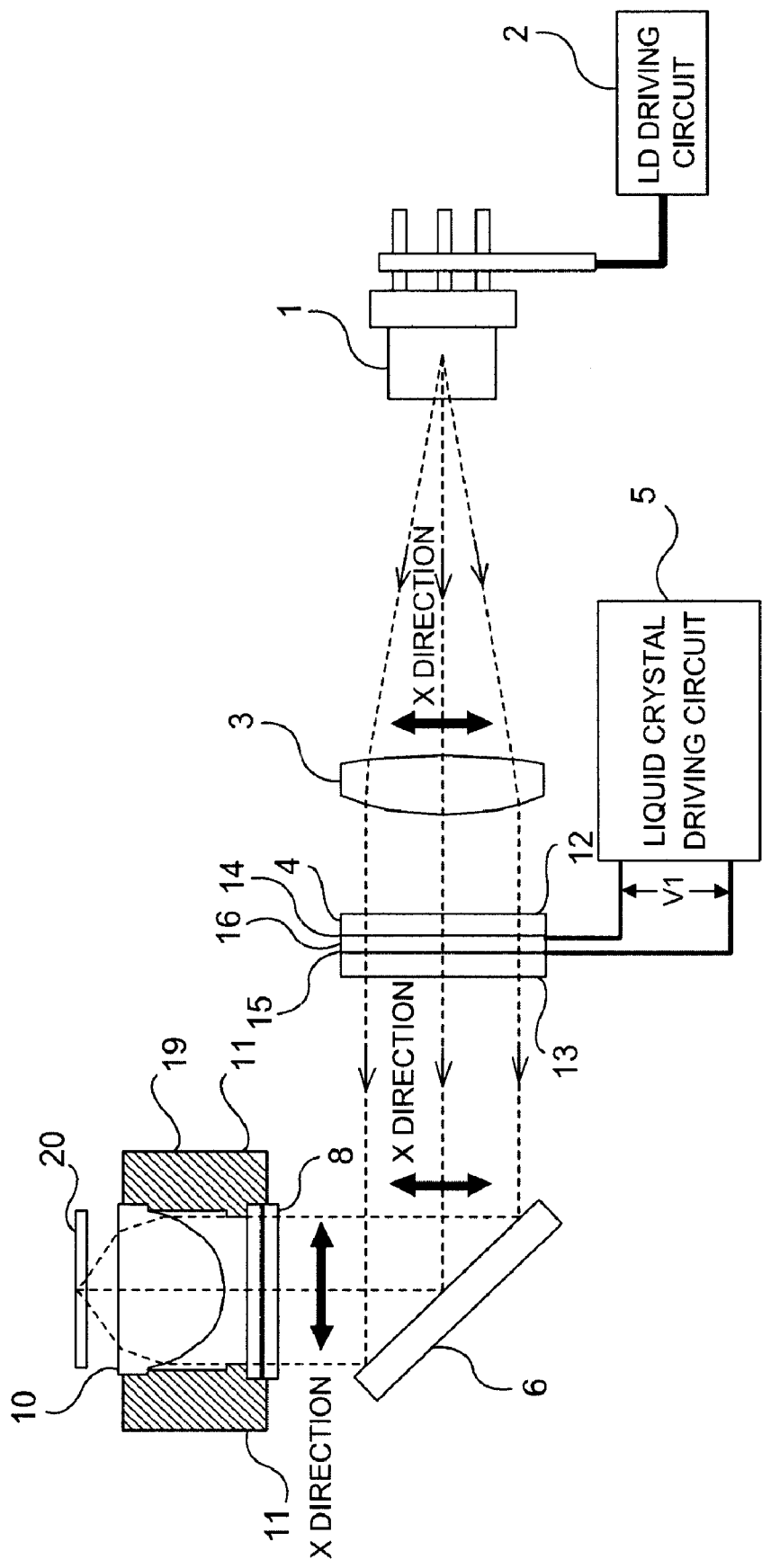
FIG. 1 is a functional block diagram showing one example of the overall configuration of an optical pickup device according to the present invention.
Figure 2:
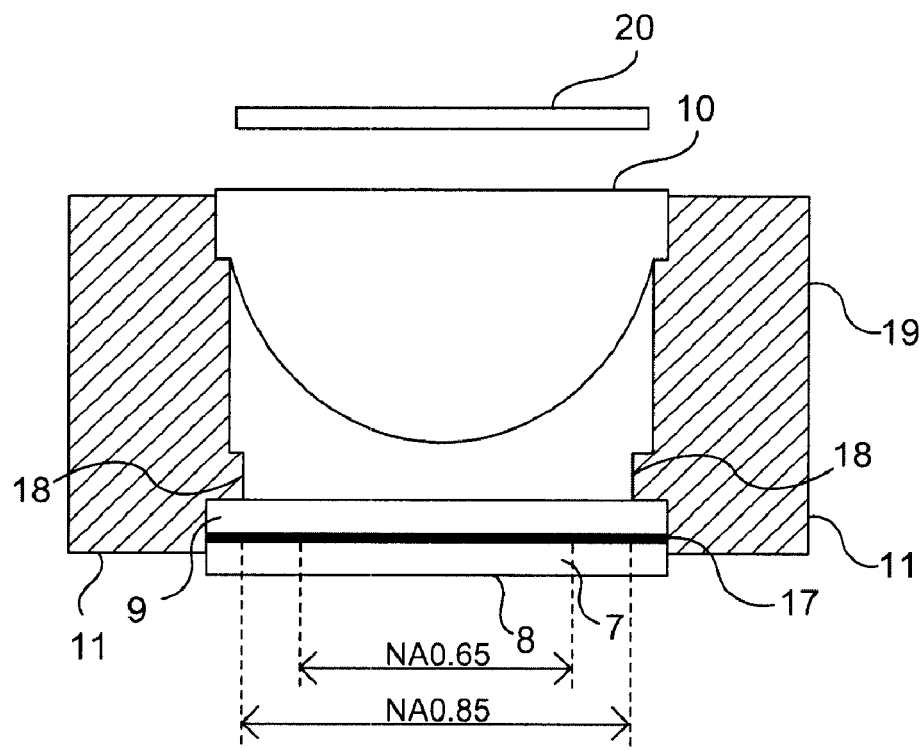
FIG. 2 is a detail view of an objective lens and a polarizing hologram element.
Figure 3:
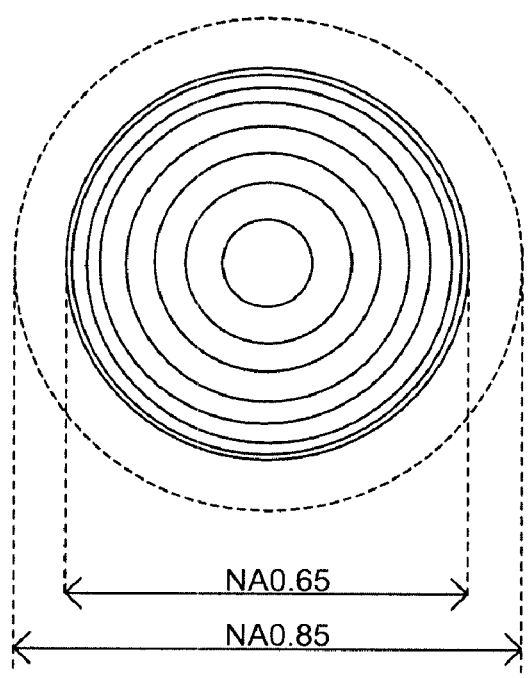
FIG. 3 is a front view of a hologram pattern formed on the polarizing hologram element.
Figure 4:
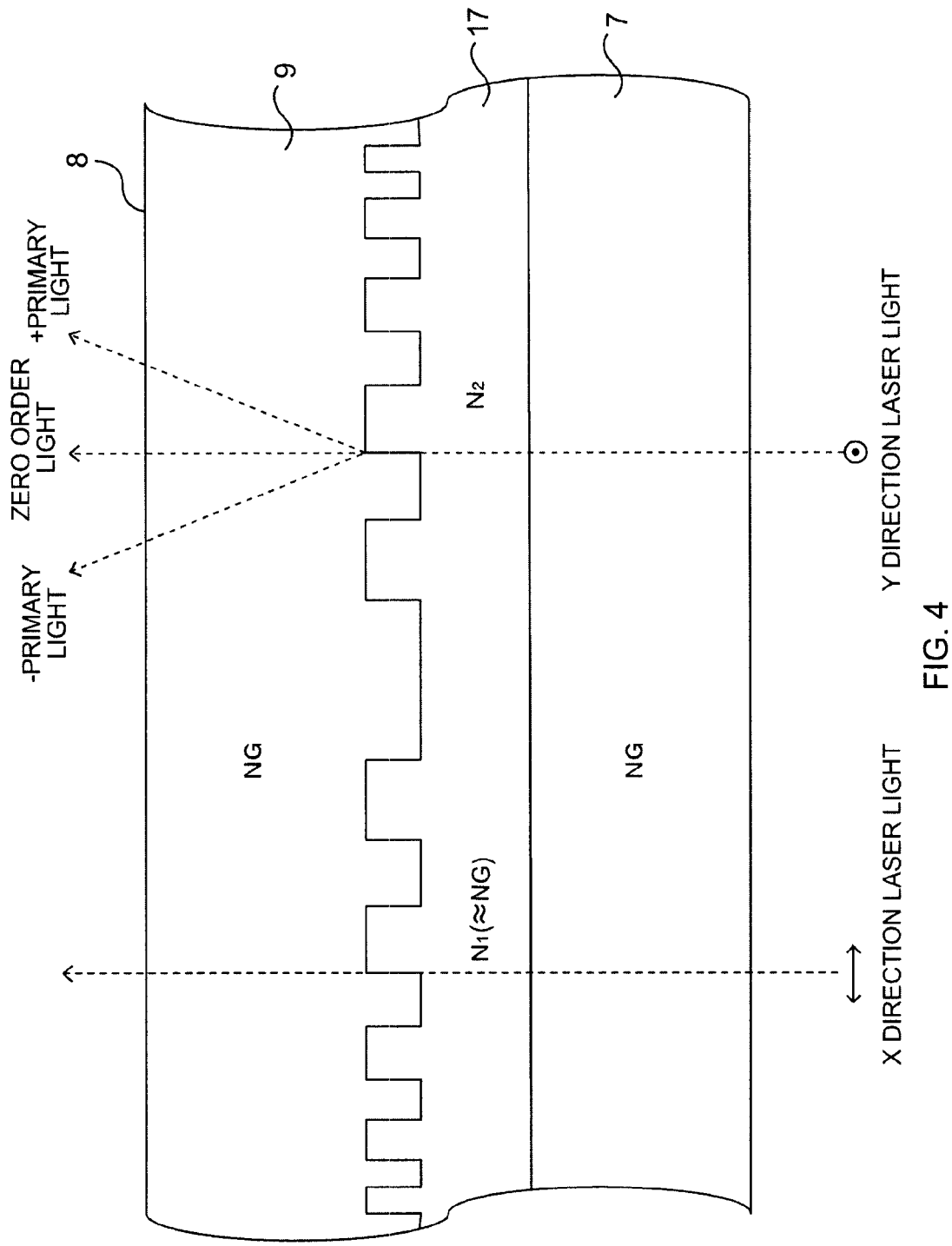
FIG. 4 is a sectional view of the hologram pattern formed on the polarizing hologram element.

The following is a description of the overall configuration of the laser converging apparatus (laser converging assembly) 19 and the optical pickup device to which the laser converging apparatus 19 applies according to the present invention. The description will be made referring to FIGS. 1 to 4. FIG. 1 is a functional block diagram showing one example of the overall configuration of the optical pickup device according to the present invention. Left-oblique lines shown in FIG. 1 represent a section of a lens holder 11, and represent the same also in other Figs. than FIG. 1. FIG. 2 is a detail view of an objective lens 10 and a polarizing hologram element 8 shown in FIG. 1. FIG. 3 is a plan view of the hologram pattern formed on the polarizing hologram element 8. FIG. 4 is a sectional view of Et hologram pattern formed on the polarizing hologram element 8. In the following description, an optical disk medium conforming to the HD DVD standard is referred to as HD DVD medium (second disk medium) 21, and an optical disk medium conforming to the Blu-ray standard is referred to as Blu-ray medium (first disk medium) 20. Also, an information recording layer in the optical disk medium is referred to as information surface. In addition, the thickness that is equivalent to a distance incoming laser light from the optical pickup device travels from one surface of the optical disk medium to the information surface is referred to as the thickness of a protective layer.

The optical pickup device comprises a blue-violet semiconductor laser 1 (semiconductor laser), a semiconductor laser (LD) driving circuit 2, a collimator lens 3, a liquid crystal element 4 (polarization direction switching element), a liquid crystal driving circuit 5, a mirror 6, and the laser converging apparatus 19. The laser converging apparatus 19 includes the polarizing hologram element 8, the objective lens 10, and the lens holder 11. No drawings are given in FIG. 1, showing the optical pickup device, for an optical system, such as an optical detector, for detecting FE (Focus Error) signals, TE (Tracking Error) signals, RF (Radio Frequency) signals, etc., an optical component, and an actuator for driving the laser converging apparatus 19 in a direction of focusing or tracking, which are incorporated into an ordinary optical pickup device.

The blue-violet semiconductor laser 1 is, for example, composed of diodes consisting of p-type semiconductors and n-type semiconductors joined via pn junctions. When a control voltage from the LD driving circuit 2 is applied to the blue-violet semiconductor laser 1, it emits blue-violet laser light having a wavelength of 400 to 410 nm, which corresponds to the HD DVD medium 21 (the thickness of a protective layer (of a second protective layer) is 0.6 mm) and the Blu-ray medium 20 (the thickness of a protective layer (of a first protective layer) is 0.075 to 0.1 mm), onto the collimator lens 3. This blue-violet laser light is the light that is linearly polarized in the X direction (first direction) parallel with the pn junction faces (hereinafter called X direction laser light (first laser light)). The X direction can be shifted by turning the blue-violet semiconductor laser 1 to allow selection of a desired polarizing direction. In this embodiment, an arrowed direction shown in FIG. 1 stands for the X direction to be understood in the further details.

The collimator lens 3 transforms the X direction laser light from the blue-violet semiconductor laser 1 into parallel light and emits the parallel right onto the liquid crystal element 4.

The liquid crystal element 4 consists of glass boards 12, 13 arranged to be confronting each other, transparent electrodes 14, 15 placed on the interior of the glass boards 12, 13, and a liquid crystal molecule layer 16 made of liquid crystal molecules sealed in between the transparent electrodes 14, 15. An ac voltage from the liquid crystal driving circuit 5 is applied to the transparent electrodes 14, 15. This causes the liquid crystal molecules in the liquid crystal molecule layer 16 to shift in the direction correspondence to the level of the ac voltage applied to the transparent electrodes 14, 15, resulting in a change in the direction of an optical indicatrix. For instance, when an ac voltage V1 from the liquid crystal driving circuit 5 is applied to the transparent electrodes 14, 15, the liquid crystal molecules shift in the direction corresponding to the ac voltage V1, and, at this time, the optical indicatrix given by the liquid crystal molecule layer 16 tilts in such a direction that the indicatrix allows the X direction laser light to pass through the liquid crystal molecule layer 16 while maintaining the original polarized direction, that is, in the direction that the indicatrix gives the X direction laser light no phase difference. On the other hand, when an ac voltage V2, lower than the ac voltage V1, from the liquid crystal driving circuit 5 is applied to the transparent electrodes 14, 15, the liquid crystal molecules shift in the direction corresponding to the ac voltage V2. At this time, the optical indicatrix given by the liquid crystal molecule layer 16 tilts in such a direction that the indicatrix causes a phase difference of half of the wavelength between each component of the plane of polarization of the X direction laser light that is parallel with and perpendicular to the major axis of the indicatrix. As a result, the X direction laser light is subjected to a phase action as effective as one exerted by a half wavelength plate in the polarizing direction, is transformed into the light polarized in the Y direction (second direction perpendicular to the page surface in FIG. 1) crossing the X direction at right angles (hereinafter referred to as Y direction laser light (second laser light)), and comes out of the liquid crystal element 4.

A conventional technique to offer the same effect as the half wavelength plate using liquid crystal is, for example, described in JP-A No. 14-260272. While the liquid crystal element 4 is used to turn the X direction laser light into the Y direction laser light in this embodiment, the crystal element 4 is not the only option for shifting the polarizing direction. For instance, a half wavelength plate made of crystal or a double refraction film, such as ARTON, can be employed. To turn the X direction laser light into the Y direction laser light using a half wavelength plate, the half wavelength plate is located on a light path for the X direction laser light, so that the X direction laser light falling on the half wavelength plate is turned into the Y direction laser light with the shifted polarization of Y direction. To let the X direction laser light pass through the liquid crystal element 4, the half wavelength plate is not located on the light path for the X direction laser light, so that the X direction laser light is emitted onto the mirror 6 without being transformed.

The mirror 6 reflects the x direction laser light and Y direction laser light from the liquid crystal element 4 to send them to the polarizing hologram element 8.

The polarizing hologram element 8 is made by sealing a double refractive material 17, such as liquid crystal or lithium niobate, with glass boards 7, 9. The hologram pattern shown in FIGS. 3, 4 is formed between the double refractive material 17 and the glass board 9. Concentric circles shown in FIG. 3 represent the plan view of the hologram pattern on the incident side of the X direction laser light and Y direction laser light (lower side in FIG. 1). Rectangles shown in FIG. 4 represent the sectional view that is given by cutting the hologram pattern seen in perpendicular to the page surface in FIG. 1 along the incident direction of the X direction laser light and Y direction laser light. The hologram pattern is formed in an NA 0.65 area (second area), which is inside an NA 0.85 area (first area) of the objective lens 10 that corresponds to the Blu-ray medium 20.

The double refractive material 17 shows a refractive index n1, which is almost equal to the refractive index ng of the glass boards 7, 9, against the X direction laser light. The X direction laser light, therefore, passes through the polarizing hologram element 8 without being diffracted as shown in FIG. 4, and proceeds to the objective lens 10. The double refractive material 17, however, shows a refractive index n2, which is different from the refractive index ng of the glass boards 7, 9, against the Y direction laser light. Because of this, the Y direction laser light is diffracted by the hologram pattern, thus turned into, for example, zero order light and ∓primary light as shown in FIG. 4. In other words, the hologram pattern is so optimized that, for example, the aberration of +primary light to the information surface of the HD DVD medium 21 becomes almost zero. This means that the hologram pattern is formed as the pattern that is determined unconditionally by such a factor as a gap between the polarizing hologram element 8, which has the hologram pattern, and the objective lens 10.

The lens holder 11 has an aperture limiting portion 18 that limits the incidence of the X direction laser light and Y direction laser light, so that the laser converging apparatus 19 is provided with a limited NA 0.85 adapted to the Blu-ray medium 20. The polarizing hologram element 8 and the objective lens 10 are fixed to the lens holder 11 by ordinary means of gluing or known techniques of anchoring or fitting.

The objective lens 10 has the NA 0.85 and corresponds to the Blu-ray medium 20. The objective lens 10 so converges the X direction laser light from the polarizing hologram element 8 that the X direction laser light shows almost zero aberration to the information surface of the Blu-ray medium 20. Also, the objective lens 10 so converges the +primary light from the polarizing hologram element 8 that the +primary light shows almost zero aberration to the information surface of the HD DVD medium 21.

=Operation of the Optical Pickup Device to which the Laser Converging Apparatus Applies=

(1) Operation of the optical pickup device in application to the Blu-ray medium 20

The following is a description of the operation of the laser converging apparatus 19 and the optical pickup device to which the laser converging apparatus 19 applies according to the present invention, in application to the Blu-ray medium 20. The description will be made referring to FIGS. 1 to 4.

The Blu-ray medium 20 is an optical disk medium conforming to the Blu-ray standard specifying the protective layer thickness of 0.075 to 0.1 mm. The Blu-ray medium 20 is held with a chucking mechanism on the front end of a disk motor (no drawing is given), which revolves the Blu-ray medium 20 at a given linear velocity (or angular velocity).

When the optical pickup device starts operating, the LD driving circuit 2 applies the control voltage to the blue-violet semiconductor laser 1, which in response emits the X direction laser light having the wavelength of 400 to 410 nm onto the collimator lens 3. The X direction laser light turns into parallel light while passing through the collimator lens 3, and proceeds further to the liquid crystal element 4. The liquid crystal driving circuit 5 applies the ac voltage V1 to the transparent electrodes 14, 15 when the optical pickup device starts operating. In response, the liquid crystal molecules in the liquid crystal molecule layer 16 shift in the direction corresponding to the ac voltage V1. As a result, the optical indicatrix of the liquid crystal molecule layer 16 tilts in such a direction that the indicatrix allows the X direction laser light to pass through the liquid crystal element 4 while maintaining the original polarizing direction. The X direction laser light, therefore, passes through the glass board 12, the liquid crystal molecule layer 16, and the glass board 13 to be incident on the mirror 6. The X direction laser light is then reflected by the mirror 6, and is sent to the polarizing hologram element 8. The double refractive material 17 of the polarizing hologram element 8 shows the refractive index n1 equal to the refractive index ng of the glass boards 7, 9 against the X direction laser light. Because of this, the X direction laser light is not diffracted by the hologram pattern, and passes through glass board 7, the double refractive material 17, and the glass board 9 in the NA 0.85 area to be incident on the objective lens 10 (see the X direction laser light in FIG. 4). The X direction laser light is so converged by the objective lens 10 that X direction laser light shows almost zero aberration to the information surface of the Blu-ray medium 20. Hence the converged x direction laser light is projected on the information surface of the Blu-ray medium 20 to execute recording and reproduction on the Blu-ray medium 20 in a fine manner.

(2) Operation of the Optical Pickup Device in Application to the HD DVD Medium 21

Figure 5:
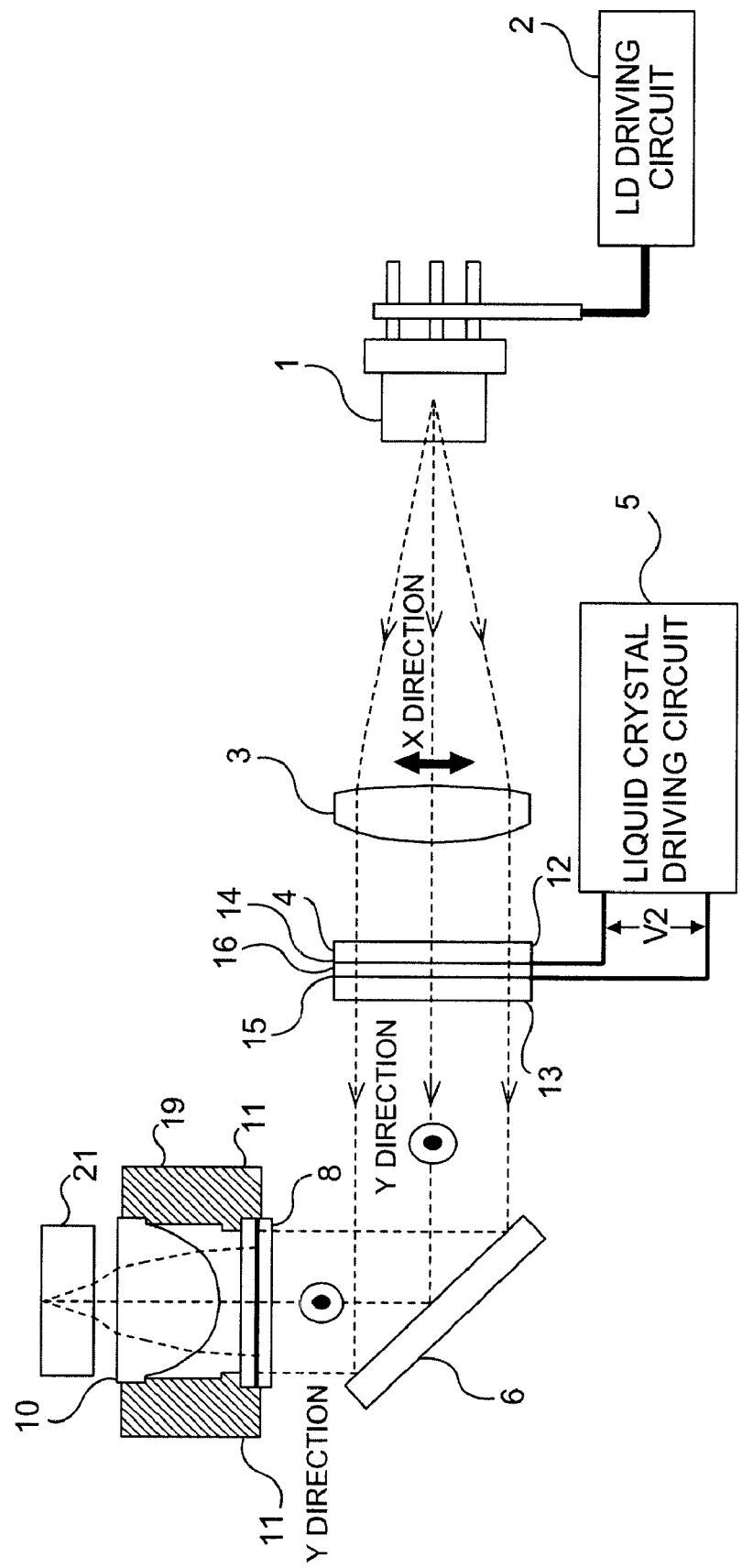
FIG. 5 is a general block diagram for describing the operation of the optical pickup device in application to an HD DVD medium.
Figure 6:
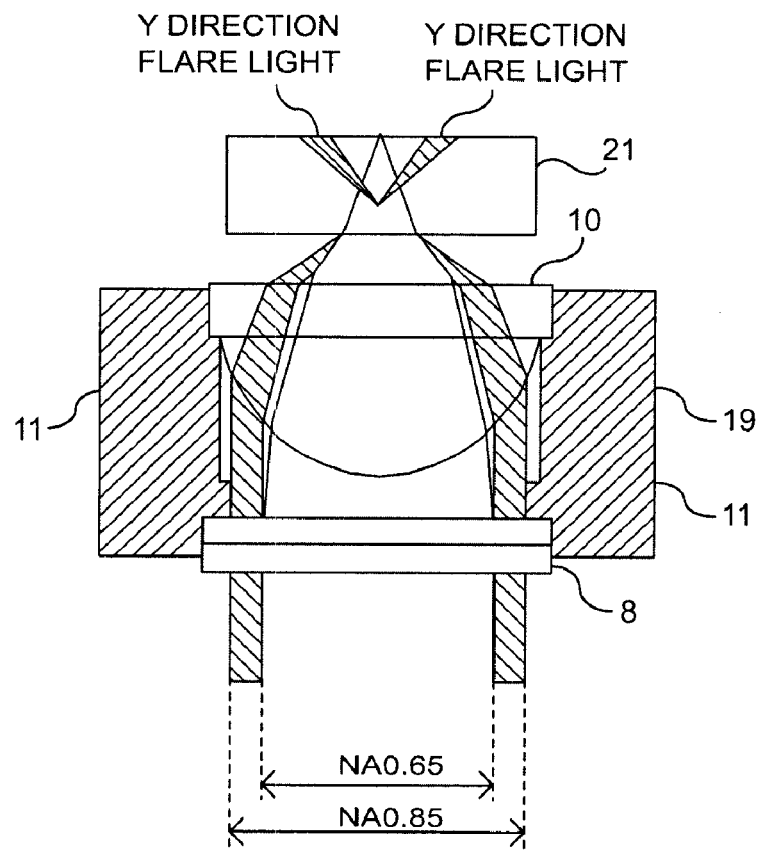
FIG. 6 is a graphic diagram showing the exemplary state of Y direction laser light in a laser converging apparatus and an HD DVD medium.
Figure 7:
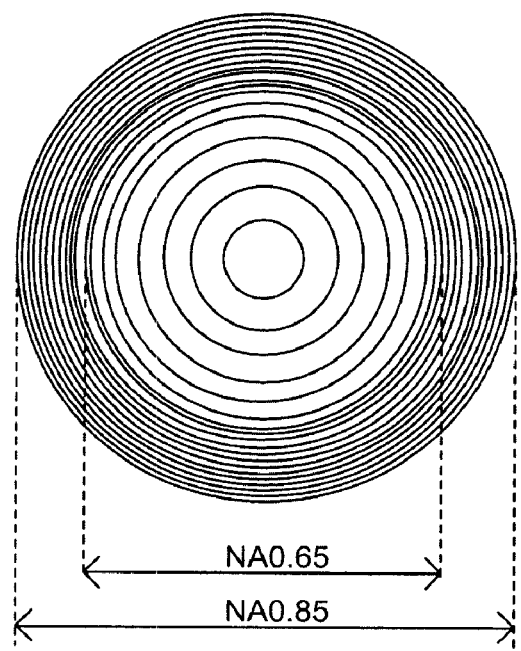
FIG. 7 is a graphic diagram showing a diffusion hologram pattern formed in the part of an NA 0.85 area other than an NA 0.65 area.
Figure 8:
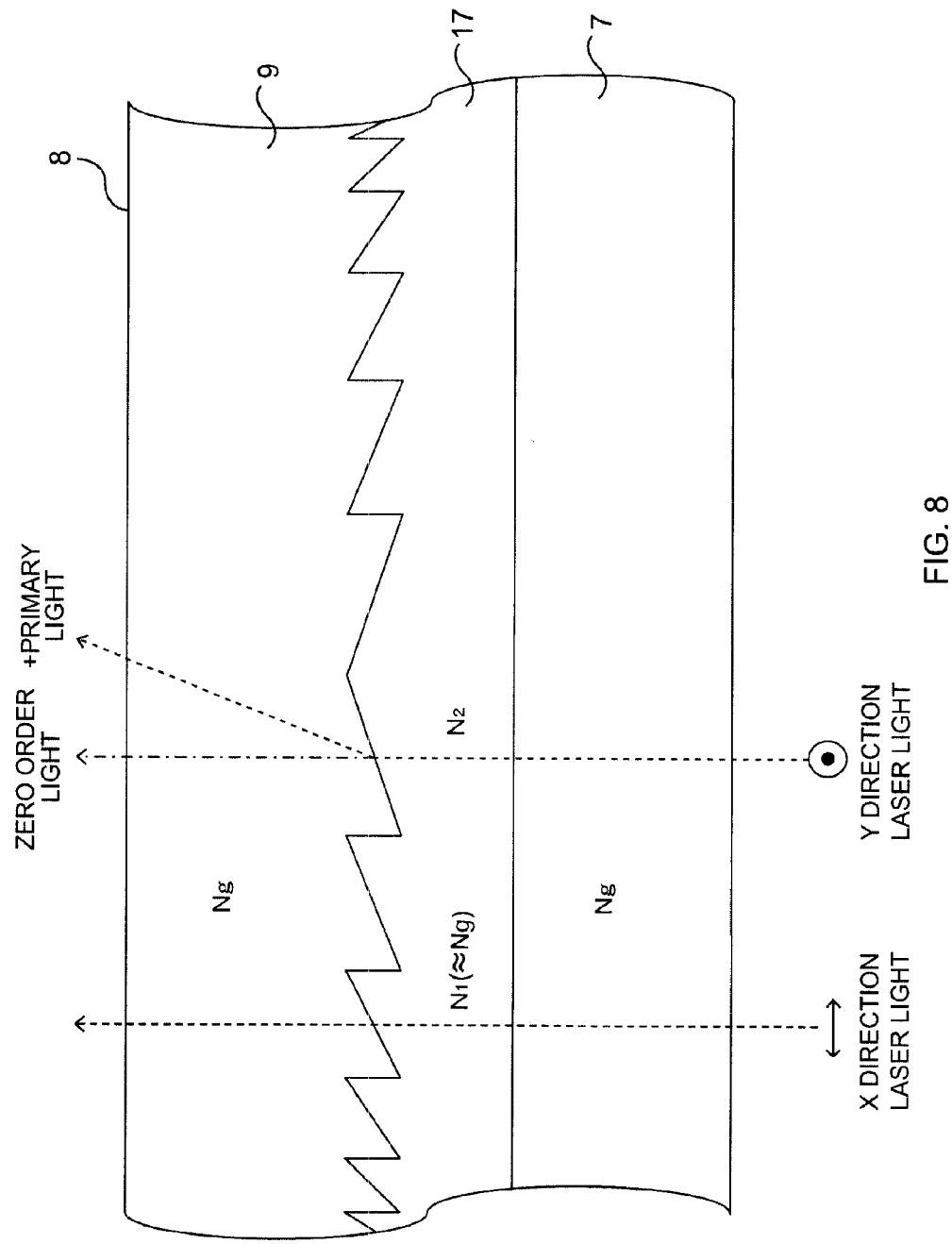
FIG. 8 is a graphic diagram showing another sectional shape of the hologram pattern.
Figure 9:
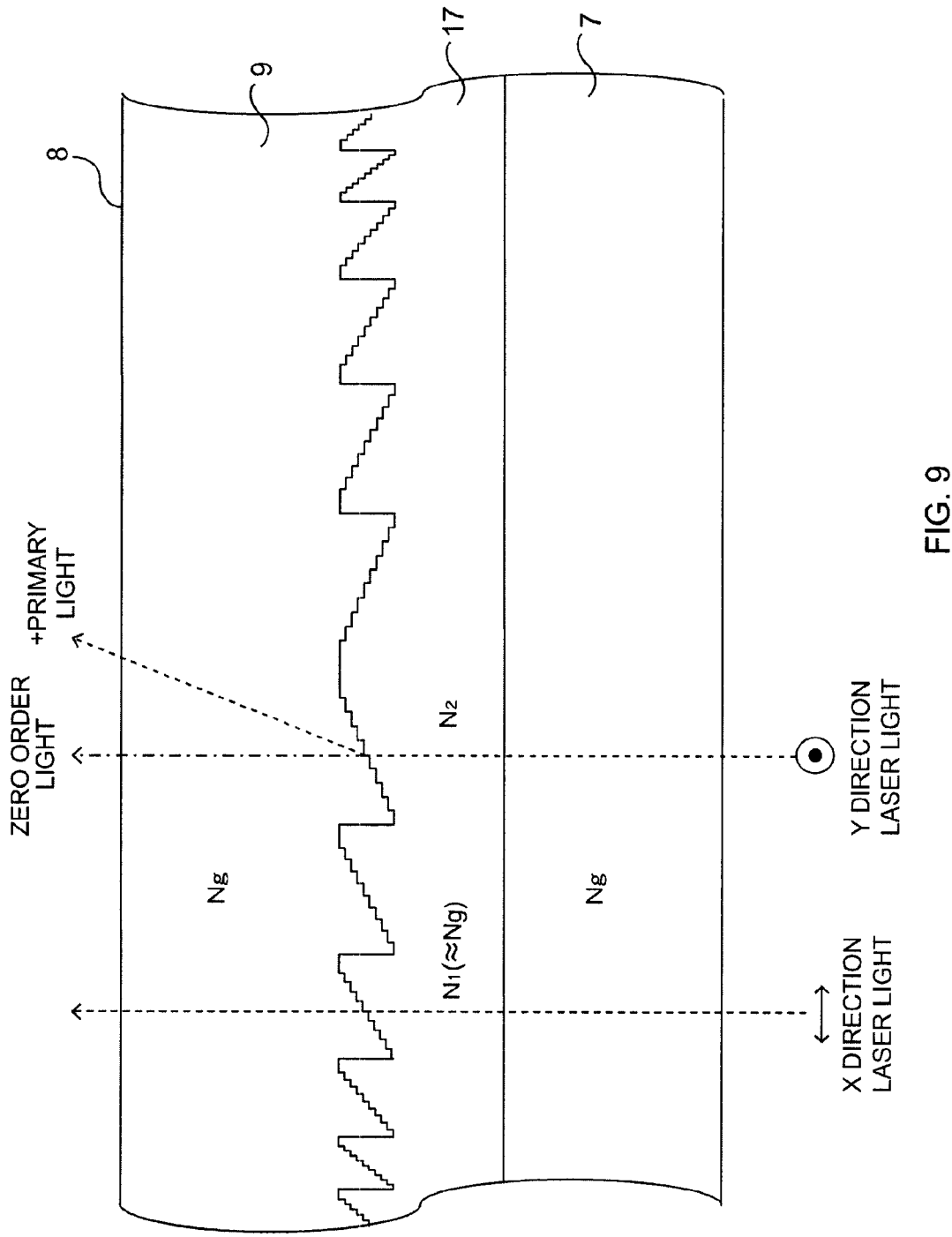
FIG. 9 is a graphic diagram showing still another sectional shape of the hologram pattern.

The following is a description of the operation of the laser converging apparatus 19 and the optical pickup device to which the laser converging apparatus 19 applies according to the present invention, in application to the HD DVD medium 21. The description will be made referring to FIGS. 2 to 9. FIG. 5 is a general block diagram for describing the operation of the optical pickup device shown in FIG. 1 in application to the HD DVD medium 21. FIG. 6 is a graphic diagram showing the exemplary state of Y direction laser light in the laser converging apparatus 19 and the HD DVD medium 21. FIG. 7 is a graphic diagram showing a diffusion hologram pattern formed in the part of the NA 0.85 area other than an NA 0.65 area. FIGS. 8, 9 are graphic diagrams showing other sectional shapes of the hologram pattern.

The HD DVD medium 21 is an optical disk medium conforming to the HD DVD standard specifying the protective layer thickness of 0.6 mm. Like the Blu-ray medium 20, the HD DVD medium 21 is held with the chucking mechanism on the front end of the disk motor (no drawing is given), which revolves the HD DVD medium 21 at a given linear velocity (or angular velocity).

As described above, when the optical pickup device starts operating, the LD driving circuit 2 applies the control voltage to the blue-violet semiconductor laser 1, which in response emits the X direction laser light having the wavelength of 400 to 410 nm onto the collimator lens 3. The X direction laser light turns into parallel light while passing through the collimator lens 3, and proceeds further to the liquid crystal element 4. The liquid crystal driving circuit 5 applies the ac voltage V1 to the transparent electrodes 14, 15 when the optical pickup device starts operating. In response, the liquid crystal molecules in the liquid crystal molecule layer 16 shift in the direction corresponding to the ac voltage V1. As a result, the optical indicatrix of the liquid crystal molecule layer 16 tilts in such a direction that the indicatrix allows the X direction laser light to pass through the liquid crystal element 4 while maintaining the original polarizing direction. The X direction laser light, therefore, passes through the glass board 12, the liquid crystal molecule layer 16, and the glass board 13 to be incident on the mirror 6. Hence the X direction laser light is projected on the HD DVD medium 21 via the polarizing hologram element 8 and the objective lens 10 in the same way as described above.

In this case, however, a spherical aberration occurs because of a difference in protective layer thicknesses between the Blu-ray medium 20 and the HD DVD medium 21, and the liquid crystal driving circuit 5 receives the information indicating the occurrence of the spherical aberration. This information indicating the occurrence of the spherical aberration, for example, represents the information (e.g. FE signal) that an optical detector or the like (no drawing) detects when it receives the X direction laser light that is projected on the information surface of the HD DVD medium 21 to cause the spherical aberration. Upon receiving the information, the liquid crystal driving circuit 5 applies the ac voltage V2 to the transparent electrodes 14, 15, which in response causes the direction of the liquid crystal molecules in the liquid crystal molecule layer 16 to shift in the direction corresponding to the applied ac voltage V2. As a result, the optical indicatrix of the liquid crystal molecule layer 16 tilts in such a direction that the indicatrix acts on the X direction laser light as a half wavelength plate, and the polarizing direction of the X direction laser light is shifted to the Y direction crossing the X direction at right angles. The Y direction laser light is, therefore, emitted from the liquid crystal element 4. The Y direction laser light is emitted onto the mirror 6 via the glass board 13, and is reflected by the mirror 6 to further travel to the polarizing hologram element 8. The Y direction laser light then passes through the glass board 7 in the NA 0.85 area. The double refractive material 17 of the polarizing hologram element 8 shows the refractive index n2 different from the refractive index ng of the glass boards 7, 9 against the Y direction laser light. Because of this, the Y direction laser light falling into the NA 0.65 area inside the NA 0.85 area is diffracted by the hologram pattern between the double refractive material 17 and the glass board 9 into, for example, zero order light and ∓primary light, and falls on the objective lens 10 (see the Y direction laser light shown in FIG. 4). The +primary light is then so converged by the objective lens 10 that the +primary light shows almost zero aberration to the information surface of the HD DVD medium 21. Hence the converged +primary light is projected on the information surface of the HD DVD medium 21 to execute recording and reproduction on the HD DVD medium 21 in a fine manner.

The Y direction laser light having passed through the part of the NA 0.85 area other than the NA 0.65 area (hereinafter referred to as Y direction flare light) is not converged onto the information surface of the HD DVD medium 21 as shown in FIG. 6. The Y direction flare light, therefore, flares widely relative to the size of the optical detector when an optical magnification for an outward path from the information surface of the HD DVD medium 21 to the optical detector is larger than a given magnification, thus most part of the Y direction flare light does not fall on the detector. This ensures that the Y direction flare light does not have an effect (a decline in the signal-to-noise ratio of signals from the information surface, a change in the waveforms of servo signals obtained from the signals, etc.) on recording and reproduction operation on the HD DVD medium 21. On the other hand, when an optical magnification for a return path is smaller than a given magnification due to such a limitation as the size of an optical system, the Y direction flare light may have an effect on recording and reproduction operation on the HD DVD medium 21. To prevent that from happening, a diffusion hologram pattern is formed in the part of the NA 0.85 area other than the NA 0.65 area. This diffusion hologram pattern converges the Y direction flare light into a location separated from the information surface of the HD DVD medium 21 by a given distance or more. The Y direction laser light is thus diffracted by the diffusion hologram pattern into, for example, zero order light and ±primary light, and is converged into the location separated by the given distance. Hence the Y direction flare light comes to have less effect.

While the hologram pattern according to this embodiment has a sectional shape of rectangles, as shown in FIG. 4, this is not the only option for the sectional shape. As shown in FIG. 8, the sectional shape may be, for example, a serration having approximately linear slopes in the direction of the optical axis of the Y direction laser light (hereinafter referred to as blaze shape), or, as shown in FIG. 9, may be a serration having stepped slopes in the direction of the optical axis of the Y direction laser light (hereinafter referred to as stepped blaze shape). The hologram pattern having the section of the blaze shape or stepped blaze shape exerts greater efficiency in diffracting the +primary light from the Y direction laser light than the hologram pattern having the section of rectangles does. This enables the conversion of the +primary light with greater intensity onto the information surface of the HD DVD medium 21, allowing recording on the HD DVD medium 21 at higher speed.

According to the embodiment described above, the X direction laser light having passed through the NA0.85 area can be converged onto the information surface of the Blu-ray medium 20, and the +primary light having passed through the NA0.65 area can be converged onto the information surface of the HD DVD medium 21. This enables one objective lens 10 to serve for recording and reproduction on both optical disk media (Blu-ray medium 20 and HD DVD medium 21) to which the laser light of the same wavelength of 400 to 410 nm is used and which have different protective layer thicknesses.

Also, according to the embodiment, the Y direction laser light falling into the part of NA0.85 area other than the 0.65 area can be diffracted into zero order light and ∓primary light via the diffusion hologram pattern. This reduces the effect of the Y direction flare light on recording and reproduction operation on the HD DVD medium 21.

In addition, giving the hologram pattern the section of blaze shape or stepped blaze shape allows the hologram pattern to exert greater efficiency in diffracting the Y direction laser light. This increases the intensity of the +primary light, enabling recording on the HD DVD medium 21 at higher speed.

The embodiment thus provides the optical pickup device that comprises the blue-violet semiconductor laser 1 that emits the X direction laser light, the liquid crystal element 4, and the laser converging apparatus 19 that can be used for both optical disk media (Blu-ray medium 20 and HD DVD medium 21) to which the laser light of the same wavelength of 400 to 410 nm is used and have different protective layer thicknesses.

Second Embodiment

=An Example of the Overall Configuration of an Optical Pickup Device to which a Laser Converging Apparatus Applies=

Figure 10:
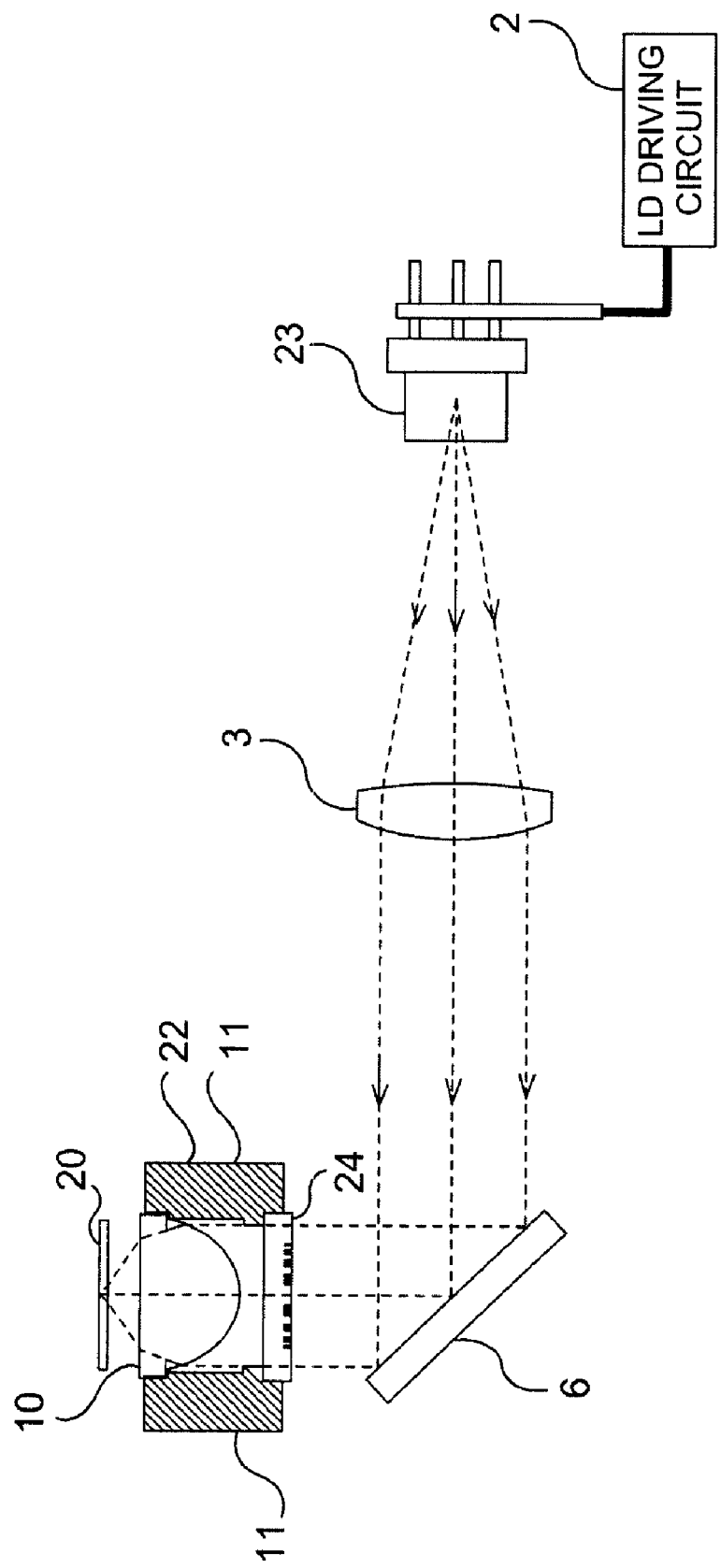
FIG. 10 is a functional block diagram showing another example of the overall configuration of the optical pickup device according to the present invention.
Figure 11:
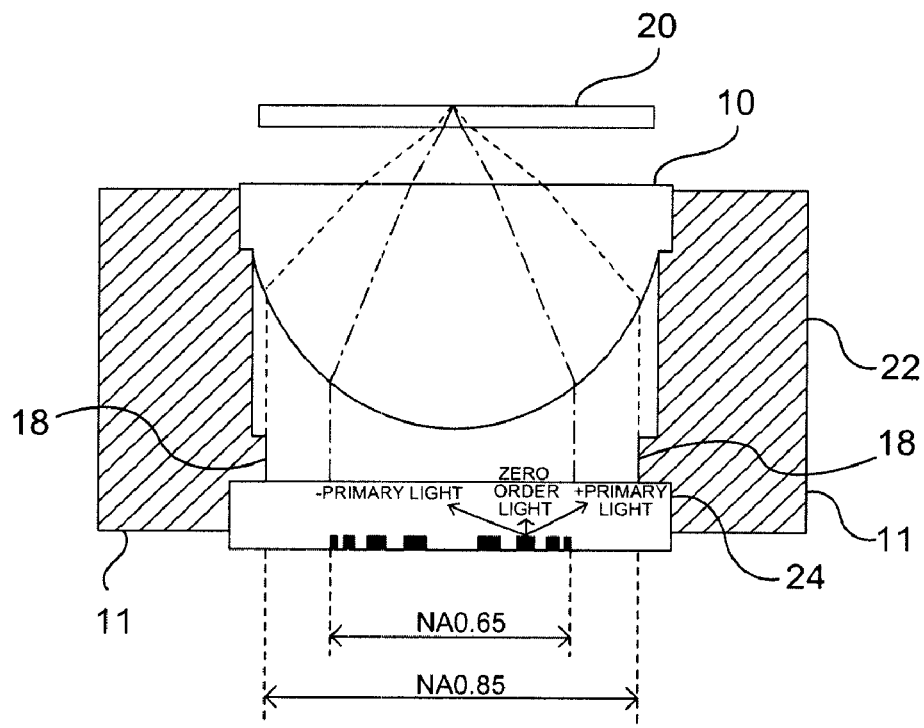
FIG. 11 is a detail view of the objective lens 10 and a nonpolarizing hologram element 24 shown in FIG. 10.
Figure 13:
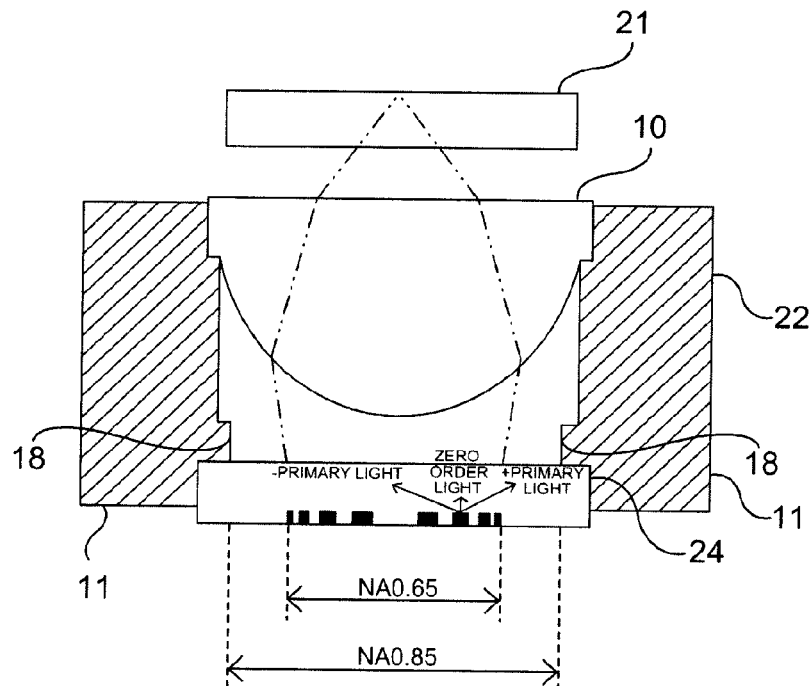
FIG. 13 is a detail view of the objective lens 10 and the nonpolarizing hologram element 24 shown in FIG. 10.

The following is a description of the overall configuration of the laser converging apparatus (laser converging assembly) 22 and the optical pickup device to which the laser converging apparatus 22 applies according to the present invention. The description will be made referring to FIGS. 3, 4, 10, 11, 13. FIG. 10 is a functional block diagram showing another example of the overall configuration of the optical pickup device according to the invention. FIGS. 11, 13 are the detail views of the objective lens 10 and a nonpolarizing hologram element 24 shown in FIG. 10. The same elements illustrated in FIG. 10 as in FIG. 1 are given the same symbols to save extra explanation.

The optical pickup device comprises a blue-violet semiconductor laser 23 (semiconductor laser), the LD driving circuit 2, the collimator lens 3, the mirror 6, and the laser converging apparatus 22. The laser converging apparatus 22 includes the nonpolarizing hologram element 24, the objective lens 10, and the lens holder 11. No drawings are given in FIG. 10, showing the optical pickup device, for an optical system, such as an optical detector, for detecting FE signals, TE signals, RF signals, etc., an optical component, and an actuator for driving the laser converging apparatus 22 in a direction of focusing or tracking, which are incorporated into an ordinary optical pickup device.

The blue-violet semiconductor laser 23 is, for example, composed of diodes consisting of p-type semiconductors and n-type semiconductors joined via pn junctions. When a control voltage from the LD driving circuit 2 is applied to the blue-violet semiconductor laser 23, it emits blue-violet laser light having the wavelength of 400 to 410 nm, which corresponds to the HD DVD medium (second disk medium) 21 (the thickness of the protective layer (of the second protective layer) is 0.6 mm) and the Blu-ray medium (first disk medium) 20 (the thickness of the protective layer (of the first protective layer) is 0.075 to 0.1 mm), onto the collimator lens 3. Different from the case in the first embodiment, this blue-violet laser light may be polarized in other directions, such as a circular direction, than a linear direction.

The collimator lens 3 transforms the blue-violet laser light from the blue-violet semiconductor laser 23 into parallel light and emits the parallel light onto the mirror 6. The mirror 6 reflects the parallel blue-violet laser light to send it to the nonpolarizing hologram element 24.

The nonpolarizing hologram element 24 is made of, for example, glass or plastic, and has a hologram pattern on the blue-violet laser light incident side (lower side in FIG. 10). The hologram pattern is formed in the NA 0.65 area (second area), which is inside the NA 0.85 area (first area) of the objective lens 10 corresponding to the Blu-ray medium 20, and is shaped into the concentric circles shown in FIG. 3 when seen from the lower side in FIG. 10. The rectangles shown in FIG. 4 represents the sectional shape that is given by cutting the hologram pattern seen in perpendicular to the page surface in FIG. 10 along the incident direction of the blue-violet laser light. The hologram pattern diffracts the blue-violet laser light into, for example, zero order light and ∓primary light, and is so optimized that, for example, the aberration of the +primary light to the information surface of the HD DVD medium 21 becomes almost zero. This means that the hologram pattern is formed as the pattern that is determined unconditionally by such a factor as a gap between the nonpolarizing hologram element 24, which has the hologram pattern, and the objective lens 10.

The lens holder 11 has the aperture limiting portion 18 to provide the laser converging apparatus 22 with the limited NA 0.85 adapted to the Blu-ray medium 20. The nonpolarizing hologram element 24 and the objective lens 10 are fixed to the lens holder 11 by ordinary means of gluing or known techniques of anchoring or fitting.

The objective lens 10 has the NA 0.85 and corresponds to the Blu-ray medium 20. The objective lens 10 is so designed that the zero order light having permeated the NA0.65 area of the nonpolarizing hologram element 24 and the laser light having permeated the part of the NA 0.85 area other than the NA 0.65 area (hereinafter referred to as permeated laser light) show almost zero aberrations to the information surface of the Blu-ray medium 20. The objective lens 10, therefore, so converges the zero order light and the permeated laser light as to make their aberration to the information surface of the Blu-ray medium 20 almost zero. Also, the objective lens 10 so converges the +primary light from the hologram pattern as to make the aberration of the +primary light almost zero to the information surface of the HD DVD medium 21.

=Operation of the Optical Pickup Device to which the Laser Converging Apparatus Applies=

(1) Operation of the Optical Pickup Device in Application to the Blu-Ray Medium 20

Figure 14:
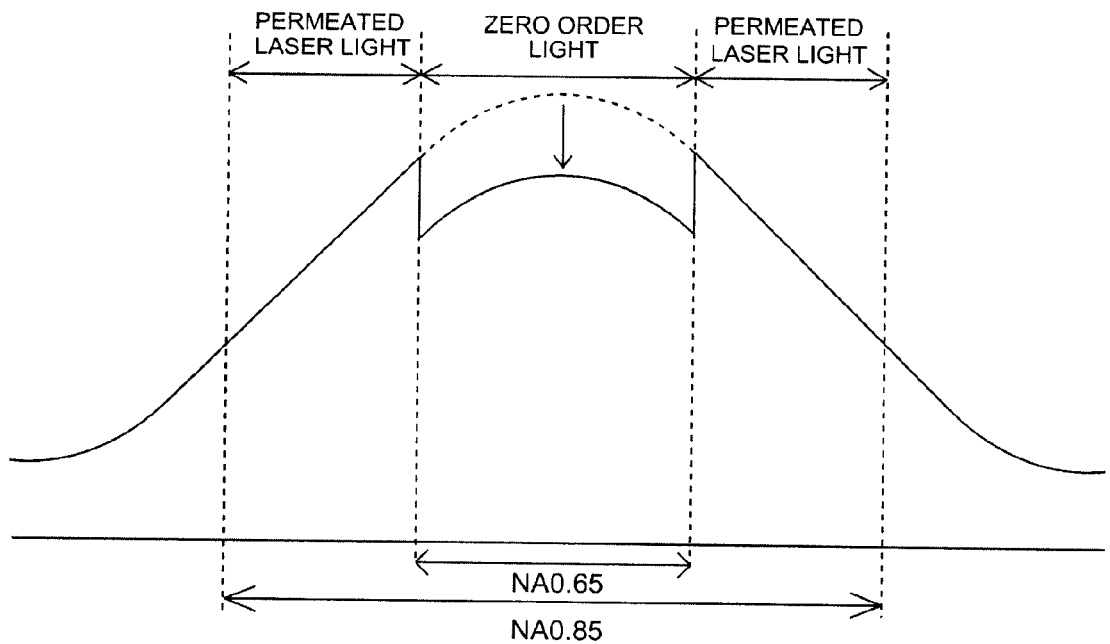
FIG. 14 is a graph depicting the intensity distribution of zero order light and permeated laser light.

The following is a description of the operation of the laser converging apparatus 22 and the optical pickup device to which the laser converging apparatus 22 applies according to the present invention, in application to the Blu-ray medium 20. The description will be made referring to FIGS. 10, 11, 14. FIG. 14 is a graph depicting the intensity distribution of zero order light and permeated laser light. In FIG. 14, the intensity levels of the zero order light and permeated laser light are indicated vertically, so that the higher in FIG. 14, the greater the indicated intensity level.

The Blu-ray medium 20 is an optical disk medium conforming to the Blu-ray standard specifying the protective layer thickness of 0.075 to 0.1 mm. The Blu-ray medium 20 is held with the chucking mechanism on the front end of the disk motor (no drawing is given), which revolves the Blu-ray medium 20 at a given linear velocity (or angular velocity).

When the optical pickup device starts operating, the LD driving circuit 2 applies a control voltage to the blue-violet semiconductor Laser 23, which in response emits the blue-violet laser light having the wavelength of 400 to 410 nm onto the collimator lens 3. The blue-violet laser light turns into parallel light while passing through the collimator lens 3, and proceeds further to the mirror 6. The blue-violet laser light is then reflected by the mirror 6, and is sent to the nonpolarizing hologram element 24. The blue-violet laser light falling into the NA0.65 area of the nonpolarizing hologram element 24 is diffracted into zero order light and ∓primary light, and is emitted onto the objective lens 10 (single-dot chain lines shown in FIG. 11). Meanwhile, the blue-violet laser light falling into the part of the NA0.85 area other than the NA0.65 area of the nonpolarizing hologram element 24 permeates nonpolarizing hologram element 24 to become the permeated laser light, and is emitted onto the objective lens 10 (broken lines shown in FIG. 11). The zero order light and permeated laser light are so converged by the objective lens 10 as to show almost zero aberration to the information surface of the Blu-ray medium 20. Hence the converged zero order light and the permeated laser light are projected on the information surface of the Blu-ray medium 20 to execute recording and reproduction on the Blu-ray medium 20 in a fine manner.

The intensity level of the blue-violet laser light is reduced in the NA0.65 area into a level shown in FIG. 14 (the intensity level of the zero order light) as the intensity level of the ∓primary light is deducted. In the NA0.85 area, which includes the intensity level of the permeated laser light, overall intensity level of the blue-violet laser light becomes approximately flat as shown in FIG. 14. Because of this, the light consisting of the permeated laser light and zero order light converged onto the information surface of the Blu-ray medium 20 (hereinafter referred to as spot light) is made smaller than spot light having an intensity level that is not approximately flat. This enables more accurate recording and reproduction on the Blu-ray medium 20.

(2) Operation of the Optical Pickup Device in Application to the HD DVD Medium 21

Figure 12:
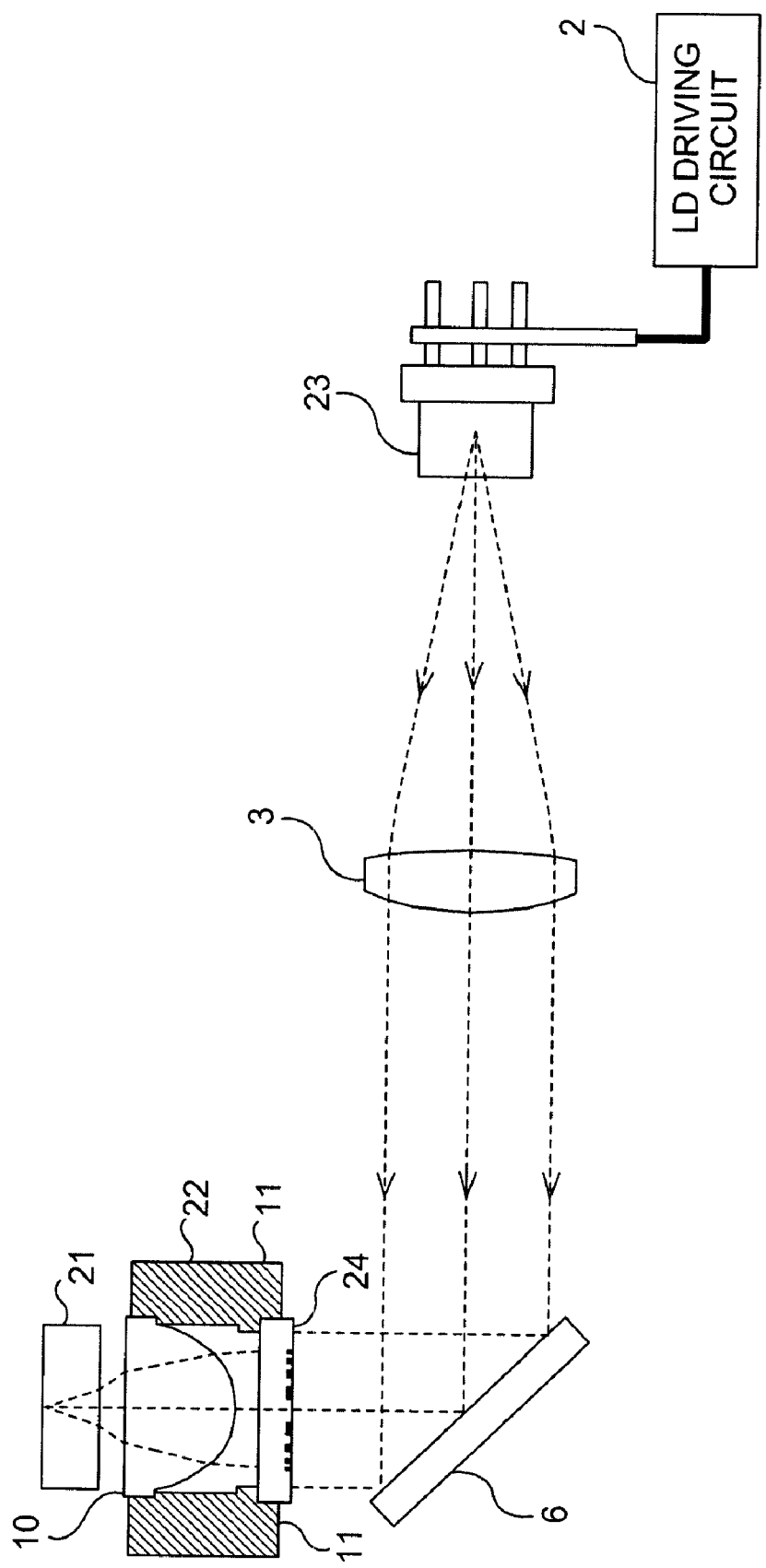
FIG. 12 is a general block diagram for describing the operation of the optical pickup device in application to an HD DVD medium.
Figure 15:
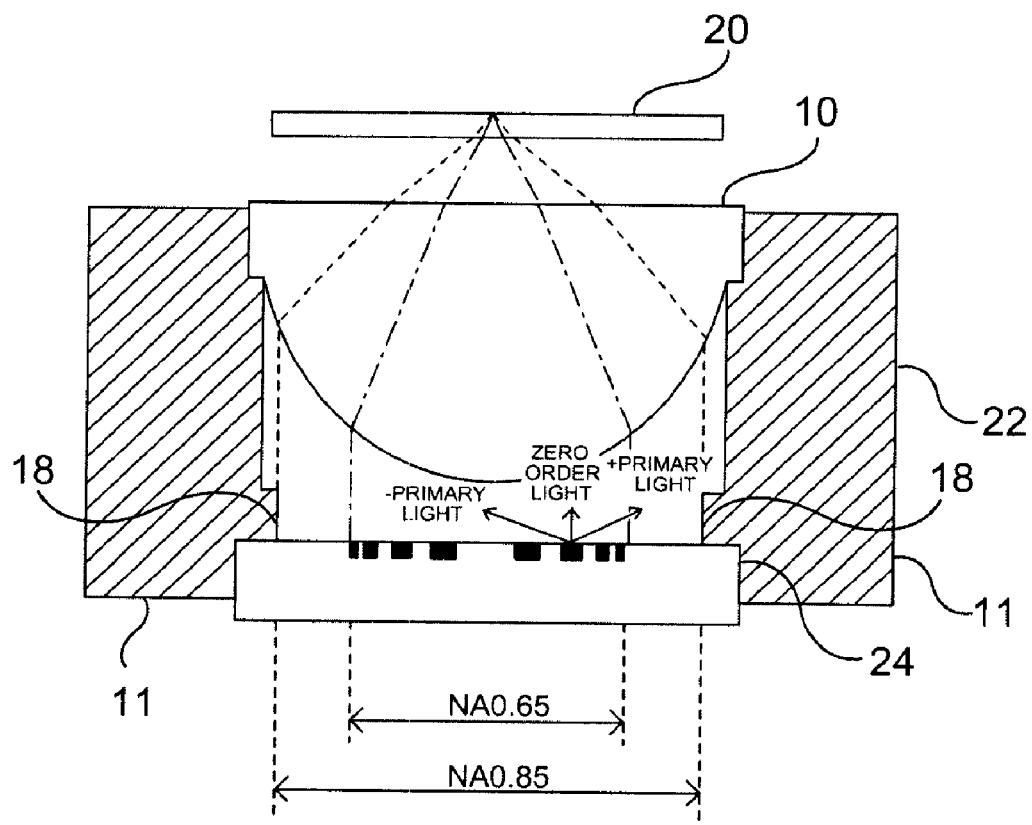
FIG. 15 is a graphic diagram showing another form of the hologram pattern.

The following is a description of the operation of the laser converging apparatus 22 and the optical pickup device to which the laser converging apparatus 22 applies according to the present invention, in application to the HD DVD medium 21. The description will be made referring to FIGS. 6, 8, 9, 12, 13, 15. FIG. 12 is a general block diagram for describing the operation of the optical pickup device shown in FIG. 10 in application to the HD DVD medium 21. FIG. 15 is a graphic diagram showing another form of the hologram pattern.

The HD DVD medium 21 is an optical disk medium conforming to the HD DVD standard specifying the protective layer thickness of 0.6 mm. Like the Blu-ray medium 20, the HD DVD medium 21 is held with the chucking mechanism on the front end of the disk motor (no drawing is given), which revolves the HD DVD medium 21 at a given linear velocity (or angular velocity).

When the optical pickup device starts operating, the LD driving circuit 2 applies the control voltage to the blue-violet semiconductor laser 23, which in response emits the blue-violet laser light having the wavelength of 400 to 410 nm onto the collimator lens 3. The blue-violet laser light turns into parallel light while passing through the collimator lens 3, and is emitted onto the mirror 6. The blue-violet laser light is then reflected by the mirror 6, and is sent to the nonpolarizing hologram element 24. The blue-violet laser light falling into the NA0.65 area of the nonpolarizing hologram element 24 is diffracted into zero order light and ∓primary light, and the +primary light is emitted onto the objective lens 10 (two-dot chain lines shown in FIG. 13). The +primary light is so converged by the objective lens 10 as to show almost zero aberration to the information surface of the HD DVD medium 21. Hence the converged +primary light is projected on the information surface of the HD DVD medium 21 to execute recording and reproduction on the HD DVD medium 20 in a fine manner.

The blue-violet laser light having passed through the part of the NA 0.85 area other than the NA 0.65 area (hereinafter referred to as flare light) is not converged onto the information surface of the HD DVD medium 21 as shown in FIG. 6 in the first embodiment. The flare light, therefore, flares widely relative to the size of the optical detector when an optical magnification for an outward path from the information surface of the HD DVD medium 21 to the optical detector is larger than a given magnification, thus most part of the flare light does not fall on the detector. This ensures that the flare light does not have an effect (a decline in the signal-to-noise ratio of signals from the information surface, a change in the waveforms of servo signals obtained from the signals, etc.) on recording and reproduction on the HD DVD medium 21. On the other hand, when an optical magnification for a return path is smaller than a given magnification due to such a limitation as the size of the optical system, the flare light may have an effect on recording and reproduction on the HD DVD medium 21. To prevent that from happening, a diffusion hologram pattern, which has the same function as the diffusion hologram pattern according to the first embodiment, is formed in the part of the NA 0.85 area other than the NA 0.65 area. As a result, the blue-violet laser light is diffracted, for example, into zero order light and ∓primary light by the diffusion hologram pattern, and is converged into a location separated from the information surface by a given distance to reduce the effect of the flare right.

While the nonpolarizing hologram element 24 has the hologram pattern on the blue-violet laser light incident side according to this embodiment, the location of the hologram pattern is not limited to this position. For example, as shown in FIG. 15, the hologram pattern may be formed on the objective lens 10 side. The hologram pattern formed on the objective lens 10 side is located in a space enclosed with the objective lens 10, the lens holder 11, and the nonpolarizing hologram element 24. The enclosed space can protect the hologram pattern from damage due to dust, flaws, etc. Hence more accurate recording and reproduction can be carried out on the Blu-ray medium 20 and the HD DVD medium 21.

The sectional shape of the hologram pattern according to this embodiment is not limited to rectangles. The section of the hologram pattern can be made selectively into the blaze shape shown in FIG. 8 or the stepped blaze shape shown in FIG. 9, according to an application of the optical pickup device (for example, reproduction only for the Blu-ray medium 20; both recording and reproduction for the HD DVD medium 21). An example of the sectional shapes of the hologram pattern corresponding to applications of the optical pickup device is described below.

The optical pickup device, for example, may be for use in both recording and reproduction on the Blu-ray medium 20, and in reproduction only on the HD DVD medium 21. In this case, the hologram pattern is given the sectional shape of rectangles that diffracts the blue-violet laser light (intensity 100%) into, for example, zero order light having 80% intensity enabling both recording and reproduction, and into ∓primary light having 10% intensity enabling only reproduction. As the rectangles made deeper in the direction of optical axis of the blue-violet laser light, the intensity of the ∓primary light increases while that of the zero order light decreases.

As a result, the zero order light of 80% intensity and the permeated laser light (100% intensity with no diffraction) having permeated the part of the NA 0.85 area other than the NA0.65 area are projected onto the information surface of the Blu-ray medium 20 to enable recording and reproduction. Meanwhile, the +primary light of 10% intensity is projected onto the information surface of the HD DVD medium 21 to enable reproduction only.

In another case, the optical pickup device may be for use in recording only on the Blu-ray medium 20, and in both recording and reproduction on the HD DVD medium 21. In this case, the hologram pattern is given the section of blaze shape or stepped blaze shape that diffracts the blue-violet laser light (intensity 100%) into, for example, zero order light having 20% intensity enabling only reproduction, into +primary light having 80% intensity enabling both recording and reproduction, and into −primary light having 0% intensity. As the blaze shape or stepped blaze shape made deeper in the direction of optical axis of the blue-violet laser laser light, the intensity of the +primary light increases.

As a result, the zero order light of 20% intensity and the permeated laser light (100% intensity with no diffraction) having permeated the part of the NA 0.85 area other than the NA0.65 area are projected onto the information surface of the Blu-ray medium 20 to enable reproduction only. Meanwhile, the +primary light of 80% intensity is projected onto the information surface of the HD DVD medium 21 to enable both recording and reproduction.

This embodiment makes it possible to converge the permeated laser light having permeated the part of the NA 0.85 area other than the NA0.65 area and the zero order light having permeated the NA0.65 area onto the information surface of the Blu-ray medium 20, and to converge the +primary light having permeated the NA0.65 area onto the information surface of the HD DVD medium 21.

As a result, one object lens 10 is capable of serving for both recording and reproduction on the optical disk media (Blu-ray medium 20 and HD DVD medium 21) to which the laser light of the same wavelengths (400 to 410 nm) is used and which have different protective layer thicknesses.

Also, according to the embodiment, the blue-violet laser light falling into the part of the NA 0.85 area other than the NA0.65 area can be diffracted into the zero order light and the ∓primary light via the diffusion hologram pattern.

This reduces the effect of the flare light on the recording and reproduction on the HD DVD medium 21.

Besides, the hologram pattern is formed on the objective lens 10 side to be inside the space enclosed with the nonpolarizing hologram element 24, the lens holder 11, and objective lens 10. This protects the hologram pattern from damage due to dust, flaws, etc.

Hence more accurate recording and reproduction operation can be carried out on the Blu-ray medium 20 and the HD DVD medium 21.

The embodiment thus provides the optical pickup device that comprises the blue-violet semiconductor laser 23 that emits the blue-violet laser light, and the laser converging apparatus 22 that can be used for both optical disk media (Blu-ray medium 20 and HD DVD medium 21) which have different protective layer thicknesses.

Third Embodiment

=An Example of the Overall Configuration of an Optical Pickup Device to which a Laser Converging Apparatus Applies=

Figure 16:
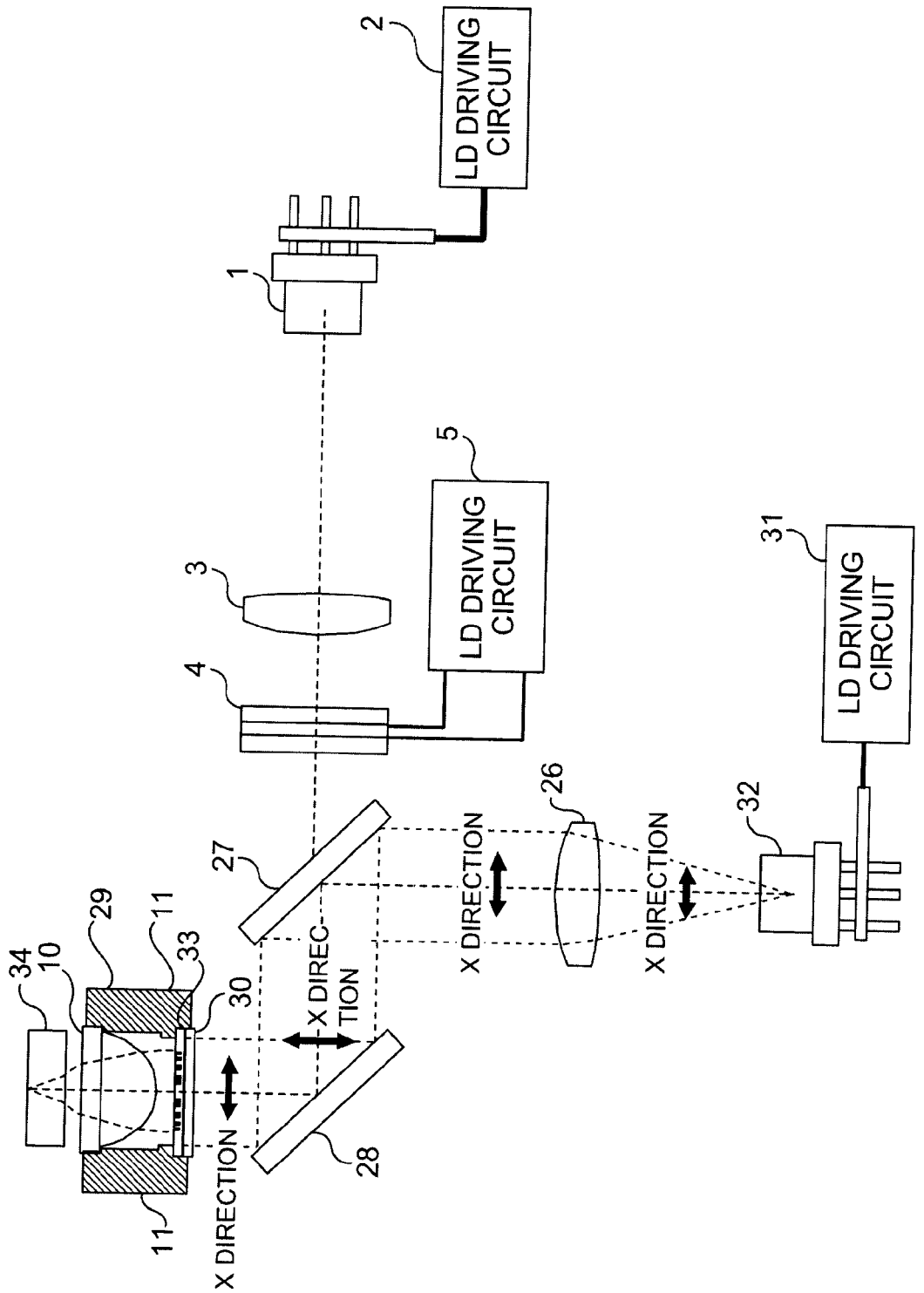
FIG. 16 is a functional block diagram showing another example of the overall configuration of the optical pickup device according to the present invention.
Figure 17:
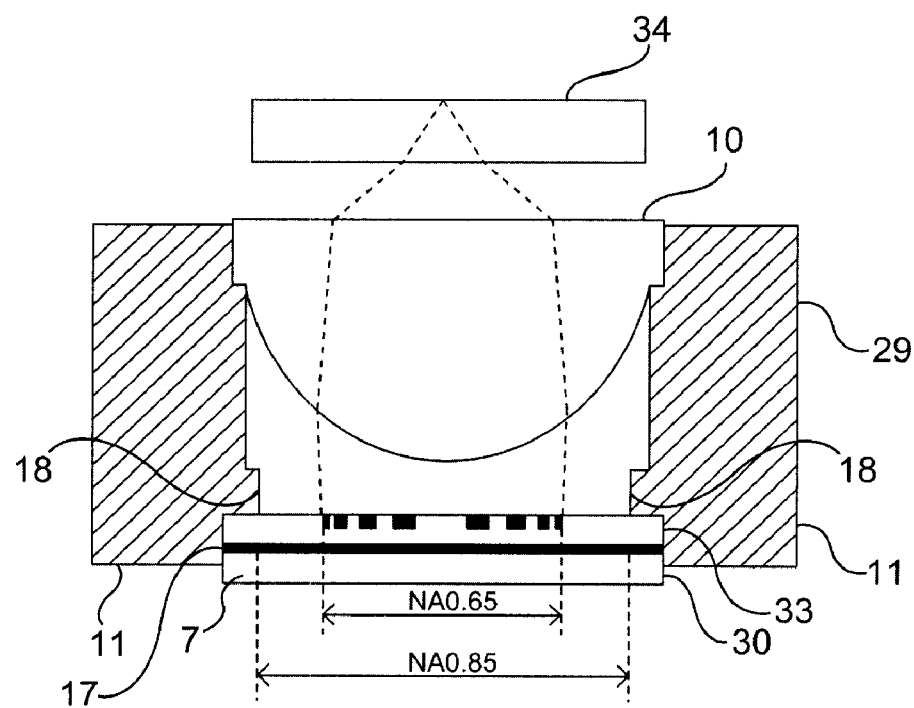
FIG. 17 is a detail view of the objective lens, a nonpolarizing hologram element, and a polarizing hologram element.
Figure 18:
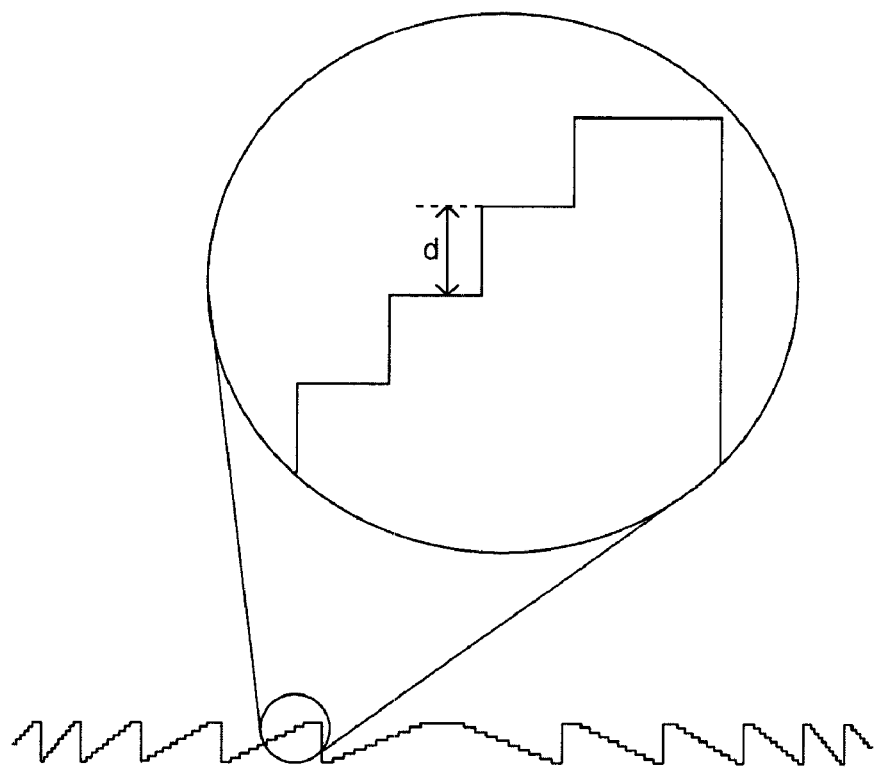
FIG. 18 is a detail view of a hologram pattern formed on the nonpolarizing hologram element.

The following is a description of the overall configuration of the laser converging apparatus (laser converging assembly) 29 and the optical pickup device to which the laser converging apparatus 29 applies according to the present invention. The description will be made referring to FIGS. 3, 4, 9, and 16 to 18. FIG. 16 is a functional block diagram showing another example of the overall configuration of the optical pickup device according to the present invention. FIG. 17 is a detail view of the objective lens 10, a nonpolarizing hologram element 33, and a polarizing hologram element 30 shown in FIG. 16. FIG. 18 is a detail view of a hologram pattern formed on the nonpolarizing hologram element 33 shown in FIG. 17. In the following description, an optical disk medium conforming to the DVD standard is referred to as DVD medium (third disk medium) 34. The same elements illustrated in FIG. 16 as in FIG. 1 are given the same symbols to save extra explanation.

The optical pickup device comprises the blue-violet semiconductor laser 1 (first semiconductor laser), the LD driving circuit 2, the collimator lens 3, the liquid crystal element 4 (polarization direction switching element), the liquid crystal driving circuit 5, a red semiconductor laser (second semiconductor laser) 32, a LD driving circuit 31, a collimator lens 26 for red color, a dichroic mirror 27, a mirror 28, and the laser converging apparatus 29. The laser converging apparatus 29 includes the polarizing hologram element 30, nonpolarizing hologram element 33, the objective lens 10, and the lens holder 11.

The semiconductor laser 32 is, for example, composed of diodes consisting of p-type semiconductors and n-type semiconductors joined via pn junctions. When a control voltage from the LD driving circuit 31 is applied to the semiconductor laser 32, it emits red laser light having a wavelength of 650 to 660 nm, which corresponds to the DVD medium 34 (the thickness of a protective layer (of a third protective layer) is 0.6 mm), onto the collimator lens 26 for red color. This red laser light is the light that is linearly polarized in the X direction (first direction) parallel with the pn junction faces (hereinafter referred to as X direction red laser light (third laser light)) to have the same polarizing direction as the X direction laser light emitted by the violet semiconductor laser 1. The X direction can be shifted by turning the semiconductor laser 32 to allow selection of a desired polarizing direction. In this embodiment, an arrowed direction shown in FIG. 16 stands for the X direction to be understood in the further details.

The collimator lens 26 for red color transforms the X direction red laser light into parallel light and emits the parallel right onto the dichroic mirror 27.

The dichroic mirror 27 reflects the X direction red laser light from the collimator lens 26 for red color to send the X direction red laser light to the mirror 28. The dichroic mirror 27 also transmits X direction laser light (first laser light) and Y direction laser-light (second laser light) from the liquid crystal element 4 to allow them to fall on the mirror 28.

The mirror 28 reflects the X direction red laser light, the X direction laser light, and the Y direction laser light to send them to the polarizing hologram element 30.

The polarizing hologram element 30 consists of the glass boards 7 and the double refractive material 17, which are described in the first embodiment. The hologram pattern shown in FIGS. 3, 4 (hereinafter referred to as polarizing hologram pattern) is formed between the double refractive material 17 and the nonpolarizing hologram element 33. The polarizing hologram element 30, therefore, transmits the X direction laser light and X direction red laser light without diffracting them, and diffracts the Y direction laser light as it passes through.

The nonpolarizing hologram element 33 is, for example, consists of the glass board 9 described in the first embodiment, and has a wavelength selecting hologram pattern (hereinafter referred to as nonpolarizing hologram pattern), which diffracts the X direction red laser light, on the objective lens 10 side of the glass board 9. This nonpolarizing hologram pattern is formed in an NA0.60-0.65 area (third area) corresponding to the DVD medium 34, and has the concentric circular shape as shown in FIG. 3, for example, when seen from the lower side in FIG. 16. The nonpolarizing hologram pattern seen in perpendicular to the page surface in FIG. 16 exhibits a section of the stepped blaze shape shown in FIG. 9 when cut along the incident direction of the X direction red laser light. The nonpolarizing hologram pattern diffracts the X direction red laser light into, for example, zero order light and ∓primary light (hereinafter +primary light is referred to as nonpolarized +primary light). The nonpolarizing hologram pattern has a depth d (FIG. 18) in the direction of the optical axis of the X direction laser light and the +primary light created by the diffraction of the Y direction laser light by the polarizing hologram pattern (hereinafter referred to as polarized +primary light). This depth d is integer times the value given by [wavelength of X direction laser light and polarized +primary light (400 to 410 nm)/(refractive index of nonpolarizing hologram element 33-1)]. As a result, the nonpolarizing hologram pattern transmits the X direction laser light and the polarized +primary light without diffracting them. The depth d is determined by the equation: $d=m[\lambda/(n-1)]$, where m stands for an integer, $\lambda$ for the wavelength of 400 to 410 nm, and n for the refractive index of the nonpolarizing hologram element 33 for the wavelength of 400 to 410 nm. The nonpolarizing hologram pattern is so optimized as to transmit the X direction light and the polarized +primary light and, for example, make the aberration of the nonpolarized +primary light zero to the information surface of the DVD medium 34. This means that the nonpolarizing hologram pattern is formed as the pattern that is determined unconditionally by such a factor as a gap between the nonpolarizing hologram element 33, which has the nonpolarizing hologram pattern, and the objective lens 10.

While the polarizing hologram element 30 and the nonpolarizing hologram element 33 are combined into an integral body as shown in FIGS. 16, 17, this is not the only option. The polarizing hologram element 30 and nonpolarizing hologram element 33 may be provided as separated units. In such a case, the polarizing hologram pattern is formed as the pattern that corresponds to such a factor as the distance between the polarizing hologram element 30 and the objective lens 10 so that the polarized +primary light shows almost zero aberration to the information surface of the HD DVD medium 21 (second disk medium). Meanwhile, the nonpolarizing hologram pattern is formed as the pattern that corresponds to such a factor as the distance between the nonpolarizing hologram element 33 and the objective lens 10 so that the nonpolarized +primary light shows almost zero aberration to the information surface of the DVD medium 34.

The lens holder 11 so holds the polarizing hologram element 30, the nonpolarizing hologram element 33, and the objective lens 10 as to keep them across the given gaps that correspond to the patterns of respective hologram elements. The lens holder 11 has the aperture limiting portion 18, which provides the laser converging apparatus 29 with the limited NA 0.85 (first area) adapted to the Blu-ray medium 20. The polarizing hologram element 30, the nonpolarizing hologram element 33, and the objective lens 10 are fixed to the lens holder 11 by ordinary means of gluing or known techniques of anchoring or fitting.

The objective lens 10 has the NA 0.85 and corresponds to the Blu-ray medium 20. The objective lens 10 so converges the X direction laser light from the nonpolarizing hologram element 33 that the X direction laser light shows almost zero aberration to the information surface of the Blu-ray medium 20. Also, the objective lens 10 so converges the polarized +primary light from the nonpolarizing hologram element 33 that the polarized +primary light shows almost zero aberration to the information surface of the HD DVD medium 21. Further, the objective lens 10 so converges the nonpolarized +primary light from the nonpolarizing hologram element 33 that the nonpolarized +primary light shows almost zero aberration to the information surface of the DVD medium 34.

=Operation of the Optical Pickup Device to which the Laser Converging Apparatus Applies=

Figure 19:
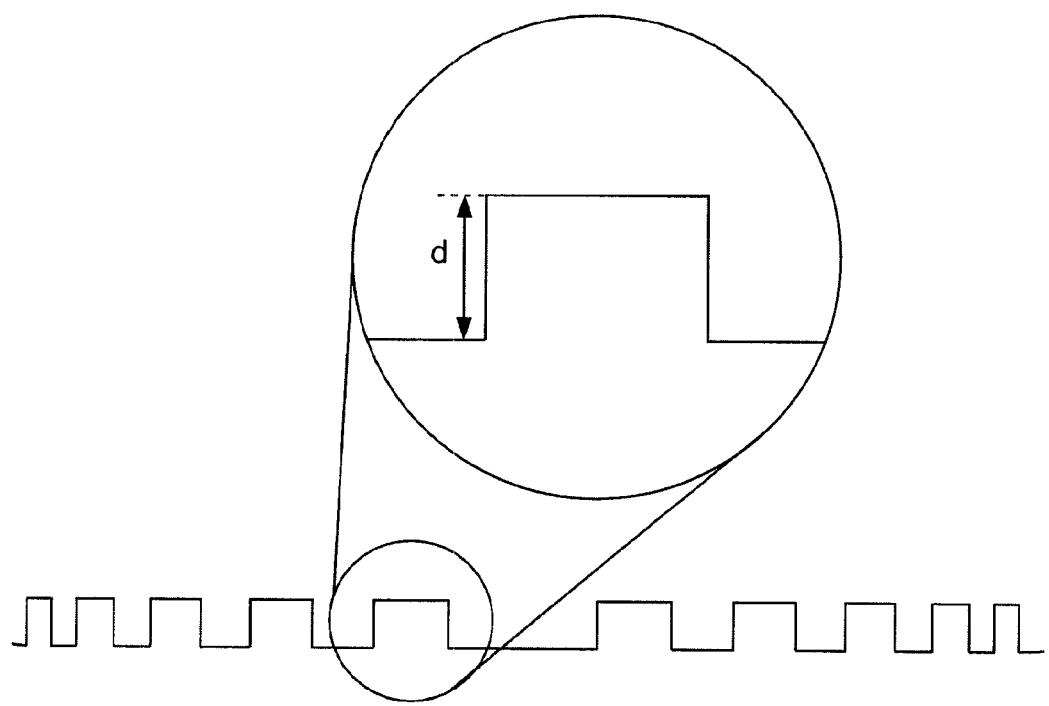
FIG. 19 is a graphic diagram showing another form of the nonpolarilzing hologram pattern.

The following is a description of the operation of the laser converging apparatus 29 and the optical pickup device to which the laser converging apparatus 29 applies according to the present invention, in application to the DVD medium 34. The description will be made referring to FIGS. 6 and 16 to 19. FIG. 19 is a graphic diagram showing another form of the nonpolarilzing hologram pattern. The operation of the optical pickup device in application to the Blu-ray medium 20 and the HD DVD medium 21 is identical with that according to the first embodiment, and, therefore, is not described in the following.

The DVD medium 34 is an optical disk medium conforming to the DVD standard specifying the protective layer thickness of 0.6 mm. The DVD medium 34, like the Blu-ray medium 20 and the HD DVD medium 21, is held with the chucking mechanism on the front end of the disk motor (no drawing is given), which revolves the DVD medium 34 at a given linear velocity (or angular velocity).

When the optical pickup device starts operating, the LD driving circuit 2 applies the control voltage to the blue-violet semiconductor laser 1, which in response emits the X direction laser light having the wavelength of 400 to 410 nm onto the collimator lens 3. The X direction laser light turns into parallel light while passing through the collimator lens 3, and proceeds further to the liquid crystal element 4. The liquid crystal driving circuit 5 applies the ac voltage V1 to the transparent electrodes 14, 15 when the optical pickup device starts operating. The liquid crystal molecules in the liquid crystal molecule layer 16 shift in the direction corresponding to the ac voltage V1. As a result, the optical indicatrix of the liquid crystal molecule layer 16 tilts in such a direction that the indicatrix allows the X direction laser light to pass through the liquid crystal element 4 while maintaining the original polarizing direction. The X direction laser light, therefore, passes through the glass board 12, the liquid crystal molecule layer 16, and the glass board 13 to be incident on the dichroic mirror 27. The X direction laser light passes through dichroic mirror 27 to proceed to the mirror 28, which then reflects the incoming X direction laser light to send it to the polarizing hologram element 30. The X direction laser light passes through the polarizing hologram element 30, as in the case of the polarizing hologram element according to the first embodiment, to fall on the nonpolarizing hologram element 33. Since the depth d of the nonpolarizing hologram pattern of the nonpolarizing hologram element 33 is integer times the value given by [wavelength of X direction laser light (400 to 410 nm)/(refractive index of nonpolarizing hologram element 33-1)], the X direction Laser light passes through the nonpolarizing hologram element 33 without being diffracted by the nonpolarizing hologram pattern, and falls on the objective lens 10. The X direction laser light is then converged by the objective lens 10, and is emitted onto the DVD medium 34.

In this case, however, a spherical aberration occurs because of a difference in protective layer thicknesses between the Blu-ray medium 20 and the DVD medium 34, and the liquid crystal driving circuit 5 receives the information indicating the occurrence of the spherical aberration. Upon receiving the information, the liquid crystal driving circuit 5 applies the ac voltage V2 to the transparent electrodes 14, 15, which in response causes the direction of the liquid crystal molecules in the liquid crystal molecule layer 16 to shift in the direction corresponding to the applied ac voltage V2. As a result, the optical indicatrix of the liquid crystal molecule layer 16 tilts in such a direction that the indicatrix acts on the X direction laser light as a half wavelength plate, and the polarizing direction of the X direction laser light is shifted to the Y direction crossing the X direction at right angles. The Y direction laser light is, therefore, emitted from the liquid crystal element 4. The Y direction laser light is emitted onto the dichroic mirror 27, passing through the dichroic mirror 27, and falling on the mirror 28, which reflects the Y direction laser light to send it to the polarizing hologram element 30. The Y direction laser light is diffracted by the polarizing hologram pattern as in the case of the first embodiment, and the polarized +primary light is then emitted onto the nonpolarizing hologram pattern. Since the depth d of the nonpolarizing hologram pattern of the nonpolarizing hologram element 33 is integer times the value given by [wavelength of polarized +primary light (400 to 410 nm)/(refractive index of nonpolarizing hologram element 33-1)], the polarized +primary light passes through the nonpolarizing hologram element 33 without being diffracted by the nonpolarizing hologram pattern, and falls on the objective lens 10. The polarized +primary light is then converged by the objective lens 10, and is emitted onto the DVD medium 34.

The DVD medium 34 is, however, designed for use with red laser light having a wavelength of 650 to 660 nm. Because of this, a color aberration or the like occurs when the polarized +primary light having the wavelength of 400 to 410 nm is projected on the DVD medium 34. The LD driving circuit 2 and the LD driving circuit 31 receive information indicating the occurrence of the aberration or the like. This information indicating the occurrence of the aberration or the like, for example, represents the information that an optical detector or the like (no drawing) detects when it receives the polarized +primary light that is projected on the information surface of the DVD medium 34 to cause the aberration or the like. Upon receiving the information, the LD driving circuit 2 stops applying the control voltage to the blue-violet semiconductor laser 1, while the LD driving circuit 31 applies the control voltage to the semiconductor laser 32. A series of operations up to the application of the control voltage to the semiconductor laser 32 is described as merely an instance, and do not exclude other options. For example, the optical pickup device may be provided with a mode changeover switch that has a Blu-ray medium 20 mode, a HD DVD medium 21 mode, a DVD medium 34 mode, etc. In this case, for example, a user manually operates the mode changeover switch and switches on a desired mode to make the LD driving circuit 31 apply the control voltage to the semiconductor laser 32 upon startup of the optical pickup device.

Responding to the control voltage, the semiconductor laser 32 emits the X direction red laser light having the wavelength of 650 to 660 nm onto the collimator lens 26 for red color. The X direction red laser light turns into parallel light while passing through the collimator lens 26, and proceeds to the dichroic mirror 27. The X direction red laser light is then reflected by the dichroic mirror 27 to fall on the mirror 28, and is reflected again by the mirror 28 to fall on the polarizing hologram element 30, where the X direction red laser light passes through the glass board 7 in the NA0.85 area. The double refractive material 17 of the polarizing hologram element 30 shows the refractive index n1 equal to the refractive index ng of the glass board 7 against the X direction red laser light. As a result, the X direction red laser light passes through the glass board 7 and the double refractive material 17 without being diffracted by the polarizing hologram pattern, and proceeds to the nonpolarizing hologram element 33. The depth d of the nonpolarizing hologram pattern of the nonpolarizing hologram element 33 is not integer times the value given by [wavelength of X direction red laser light (650 to 660 nm)/(refractive index of nonpolarizing hologram element 33-1)]. Because of this, the X direction red laser light in the NA0.60-0.65 area is diffracted into zero order light and ∓primary light by the nonpolarizing hologram pattern, and is emitted onto the objective lens 10. Subsequently, the nonpolarized +primary light is so converged by the objective lens 10 as to show almost zero aberration to the information surface of the DVD medium 34. Hence the converged nonpolarized +primary light is projected on the information surface of the DVD medium 34 to execute recording and reproduction on the DVD medium 34 in a fine manner.

While the nonpolarizing hologram pattern having the section of stepped blaze shape is used in this embodiment, the sectional shape to be adopted is not limited to this shape. For example, rectangles shown in FIG. 19 are also applicable as a sectional shape. The rectangles have a depth d in the direction of optical axis of the X direction laser light and polarized +primary light that is integer times the value given by [wavelength of X direction laser light and Y direction laser light (400 to 410 nm)/(refractive index of nonpolarizing hologram element 33-1)]. The reason for using the stepped blaze shape in this embodiment is that the nonpolarizing hologram pattern having the section of stepped blaze shape shows greater efficiency in diffracting the nonpolarized +primary light, thus transmitting the X direction laser light and polarized +primary light without fail.

The Y direction flare light having passed through the part of the NA 0.85 area other than the NA 0.65 area (second area) is not converged onto the information surface of the HD DVD medium 21 as shown in FIG. 6 of the first embodiment. The Y direction flare light, therefore, flares widely relative to the size of the optical detector when an optical magnification for an outward path from the information surface of the HD DVD medium 21 to the optical detector is larger than a given magnification, thus most part of the Y direction flare light does not fall on the detector. This ensures that the Y direction flare light does not have an effect (a decline in the signal-to-noise ratio of signals from the information surface, a change in the waveforms of servo signals obtained from the signals, etc.) on recording and reproduction operation on the HD DVD medium 21. On the other hand, when an optical magnification for a return path is smaller than a given magnification due to such a limitation as the size of the optical system, the Y direction flare light may have an effect on recording and reproduction operation on the HD DVD medium 21. To prevent that from happening, a diffusion hologram pattern, which functions in the same way as the diffusion hologram pattern according to the first embodiment, is formed in the part of the NA 0.85 area other than the NA 0.65 area. As a result, the Y direction laser light is diffracted by this diffusion hologram pattern into, for example, zero order light and ∓primary light, and is converged into a location separated from the information surface of the HD DVD medium 21 by a given distance or more. Hence the Y direction flare light comes to have less effect.

The X direction red laser light having passed through the part of the NA 0.85 area other than the NA 0.60-0.65 area (hereinafter referred to as X direction red flare light) is not converged onto the information surface of the DVD medium 34. The X direction red flare light, therefore, flares widely relative to the size of the optical detector when an optical magnification for an outward path from the information surface of the DVD medium 34 to the optical detector is larger than a given magnification, thus most part of the X direction red flare light does not fall on the detector. This ensures that the X direction red flare light does not have an effect (a decline in the signal-to-noise ratio of signals from the information surface, a change in the waveforms of servo signals obtained from the signals, etc.) on recording and reproduction operation on the DVD medium 34. On the other hand, when an optical magnification for a return path is smaller than a given magnification due to such a limitation as the size of the optical system, the X direction red flare light may have an effect on recording and reproduction operation on the DVD medium 34. To prevent that from happening, a diffusion hologram pattern is formed on one surface of the nonpolarizing hologram element 33 that has the nonpolarizing hologram pattern (see FIG. 17) in the part of the NA0.85 area other than the NA 0.60-0.65 area. This diffusion hologram pattern is so formed as to converge the X direction red flare light into a location separated from the information surface of the DVD medium 34 by a given distance or more. As a result, the X direction red laser light is diffracted by the diffusion hologram pattern into, for example, zero order light and ∓primary light, and is converged into the location separated from the information surface of the DVD medium 34 by the given distance or more. Hence the X direction red flare light comes to have less effect.

According to the laser converging apparatus 29, though the polarizing hologram element 30 and the nonpolarizing hologram element 33 are arranged in increasing order in the incident direction of the X direction laser light or the like, other arrangement is also possible. The polarizing hologram element 30 and the nonpolarizing hologram element 33 may be arranged in decreasing order in the incident direction of the X direction laser light or the like. In this case, the polarizing hologram pattern is so formed as to correspond to the distance between the polarizing hologram element 30 and the objective lens 10 so that the polarizing hologram pattern makes the aberration of the polarized +primary light almost zero to the information surface of the HD DVD medium 21. Likewise, the nonpolarizing hologram pattern is so formed as to correspond to the distance between the nonpolarizing hologram element 33 and the objective lens 10 so that the nonpolarizing hologram pattern makes the aberration of the nonpolarized +primary light almost zero to the information surface of the DVD medium 34.

This embodiment enables the convergence of the X direction laser light having passed through the NA0.85 area onto the information surface of the Blu-ray medium 20, convergence of the polarized +primary light from the polarizing hologram pattern in the NA0.65 area onto the information surface of the HD DVD medium 21, and convergence of the nonpolarized +primary light from the nonpolarizing hologram pattern in the NA0.6-0.65 area onto the information surface of the DVD medium 34. According to the embodiment, therefore, one objective lens 10 is capable of serving for recording and reproduction on both optical disk media (Blu-ray medium 20 and HD DVD medium 21) to which the laser light of the same wavelength (400 to 410 nm) is used and which have different protective layer thicknesses, and on an optical disk medium (DVD medium 34) to which the laser light of a different wavelength (650 to 660 nm) is used.

According to this embodiment, the X direction red laser light emitted from the semiconductor laser 32 can pass through the polarizing hologram element 30 without being diffracted. Besides, the section of the nonpolarizing hologram pattern is made into the rectangles whose depth d in the direction of optical axis of the X direction laser light and the polarized +primary light is integer times the value given by [wavelength of X direction laser light and polarized +primary light/(refractive index of nonpolarizing hologram element 33-1], or into the stepped blaze shape having the depth d of each step in the above direction of the optical axis that is given by [(wavelength of X direction laser light and polarized +primary light)×an integer/(refractive index of nonpolarizing hologram element 33-1]. As a result, the nonpolarizing hologram pattern can transmit the X direction laser light and polarized +primary light without diffracting them, and diffract the X direction red laser light without fail.

Also, the diffusion hologram pattern can diffract the incident Y direction laser light falling into the part of the NA0.85 area other than NA0.65 area into zero order light and ∓primary light. This reduces the effect of the Y direction flare light on recording and reproduction on the HD DVD medium 21.

The embodiment thus provides the optical pickup device that comprises the blue-violet semiconductor laser 1 that emits the X direction laser light, the liquid crystal element 4, the semiconductor laser 32 that emits the X direction red laser light, and the laser converging apparatus 29 that can be used for both optical disk media (Blu-ray medium 20 and HD DVD medium 21), to which the laser light of the same wavelength (400 to 410 nm) is used and which have different protective layer thicknesses, and also for an optical disk medium (DVD medium 34), to which the laser light of a different wavelength (650 to 660 nm) is used and which has a different protective layer thickness.

Fourth Embodiment

=An Example of the Overall Configuration of an Optical Pickup Device to which a Laser Converging Apparatus Applies=

Figure 20:
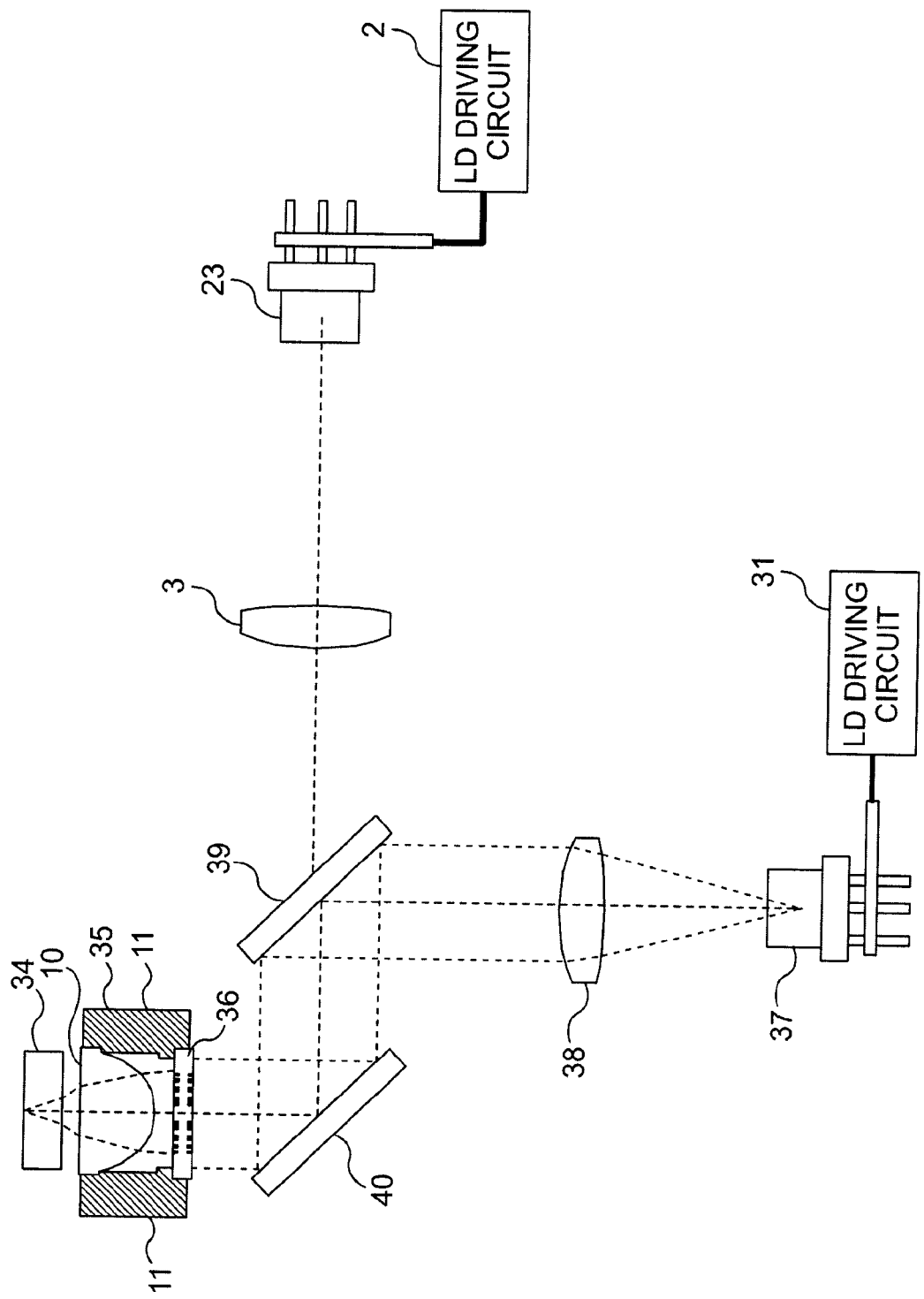
FIG. 20 is a functional block diagram showing still another example of the overall configuration of the optical pickup device according to the present invention.
Figure 21:
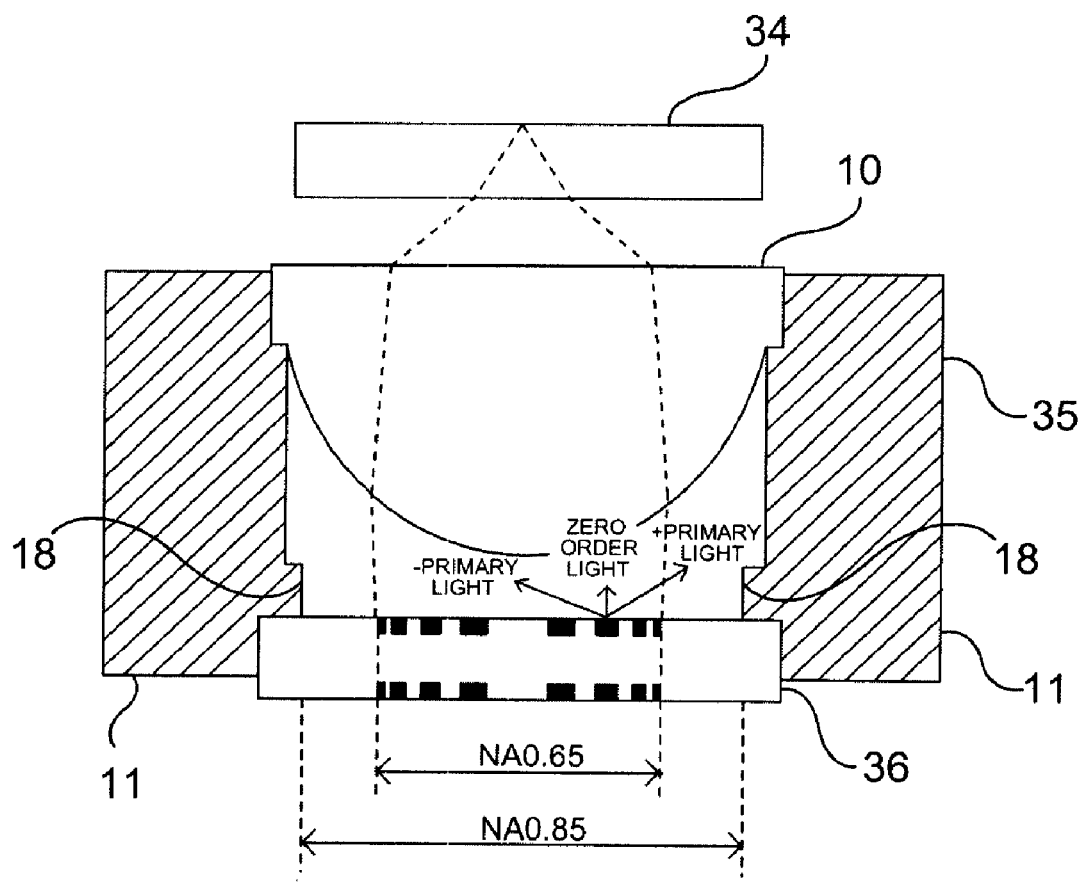
FIG. 21 is a detail view of the objective lens and the nonpolarizing hologram element.

The following is a description of the overall configuration of the laser converging apparatus (laser converging assembly) 35 and the optical pickup device to which the laser converging apparatus 35 applies according to the present invention. The description will be made referring to FIGS. 3, 9, 20, 21. FIG. 20 is a functional block diagram showing still another example of the overall configuration of the optical pickup device according to the present invention. FIG. 21 is a detail view of the objective lens 10 and a nonpolarizing hologram element 36 shown in FIG. 20. The same elements illustrated in FIG. 20 as in FIGS. 10, 16 are given the same symbols to save extra explanation.

The optical pickup device comprises the semiconductor laser 23 (first semiconductor laser), the LD driving circuit 2, the collimator lens 3, a red semiconductor laser (second semiconductor laser) 37, the LD driving circuit 31, a collimator lens 38 for red color, a dichroic mirror 39, a mirror 40, and the laser converging apparatus 35. The laser converging apparatus 35 includes the nonpolarizing hologram element (first nonpolarizing hologram element and second nonpolarizing hologram element) 36, the objective lens 10, and the lens holder 11.

The semiconductor laser 37 is, for example, composed of diodes consisting of p-type semiconductors and n-type semiconductors joined via pn junctions. When a control voltage from the LD driving circuit 31 is applied to the semiconductor laser 37, it emits red laser light having the wavelength of 650 to 660 nm (second laser light) onto the collimator lens 38 for red color. This red laser light is applicable to the DVD medium (third disk medium) 34 having the protective layer (third protective layer) of 0.6 mm thick. Different from the application according to the third embodiment, the red laser light is not limited to the laser light that is linearly polarized, but may be one that is polarized circularly or in other direction.

The collimator lens 38 for red color transforms the red laser light into parallel light, and emits the parallel light onto the dichroic mirror 39, which then reflects the parallel red laser light from collimator lens 38 to send it to the mirror 40. The dichroic mirror 39 also transmits the blue-violet laser light (first laser light) from the collimator lens 3 to allow the blue-violet laser light to proceed to the mirror 40. The mirror 40 reflects the red laser light and the blue-violet laser light to send them to the nonpolarizing hologram element 36.

The nonpolarizing hologram element 36 consists of the nonpolarizing hologram element 24 having the hologram pattern for diffracting the blue-violet laser light (hereinafter referred to as first nonpolarizing hologram pattern (first hologram pattern)) as described in the second embodiment. The first nonpolarizing hologram pattern has a depth in the direction of optical axis of the red laser light that is integer times the value given by [wavelength of red laser light (650 to 660 nm)/(refractive index of nonpolarizing hologram element 36−1)]. Because of this, first nonpolarizing hologram pattern transmits the red laser light without diffracting it.

The nonpolarizing hologram element 36 also has a hologram pattern for diffracting the red laser light (hereinafter referred to as second nonpolarizing hologram pattern (second hologram pattern)) on the objective lens 10 side. This second hologram pattern is formed in the NA0.60-0.65 area (third area) corresponding to the DVD medium 34, and has the concentric circular shape as shown in FIG. 3, for example, when seen from the lower side in FIG. 20. The second nonpolarizing hologram pattern has a section of the stepped blaze shape shown in FIG. 9 that is given by cutting the second nonpolarizing hologram pattern seen in perpendicular to the page surface in FIG. 20 along the incident direction of the red laser light. The second nonpolarizing hologram pattern diffracts the red laser light into, for example, zero order light and +primary light (hereinafter this +primary light is referred to as second +primary light (second high-order diffracted light)). The second nonpolarizing hologram pattern has a specific depth d in the direction of the optical axis of the zero order light, +primary light (hereinafter this +primary light is referred to as first +primary light (first high-order diffracted light)), which are created by the diffraction of the blue-violet laser light via the first nonpolarizing hologram pattern, and permeated laser light. This specific depth d is given by [(wavelength of zero order light, first +primary light, and permeated light (400 to 410 nm))×an integer/(refractive index of nonpolarizing hologram element 36−1)]. As a result, the second nonpolarizing hologram pattern transmits the zero order light, first +primary light, and permeated light without diffracting them. In other words, the second nonpolarizing hologram pattern is so optimized as to transmit the zero order light, first +primary light, and permeated light, and, for example, make the aberration of the second +primary light zero to the information surface of the DVD medium 34. This means that second nonpolarizing hologram pattern is formed as the pattern that is determined unconditionally by such a factor as a gap between the nonpolarizing hologram element 36, which has the second nonpolarizing hologram pattern, and the objective lens 10.

While the first nonpolarizing hologram pattern and the second nonpolarizing hologram pattern are formed integrally in the nonpolarizing hologram element 36, this is not the only option. A first nonpolarizing hologram element (no drawing) having the first nonpolarizing hologram pattern and a second nonpolarizing hologram element (no drawing) having the second nonpolarizing hologram pattern may be provided as individual units. Both nonpolarizing hologram elements then may be combined into an integral unit, or arranged as respective separate units. In this case, the first nonpolarizing hologram pattern is formed as the pattern that corresponds to the distance between the first nonpolarizing hologram element and the objective lens 10 so that the first +primary light shows almost zero aberration to the information surface of the HD DVD medium (second disk medium) 21. Meanwhile, the second nonpolarizing hologram pattern is formed as the pattern that corresponds to the distance between the second nonpolarizing hologram element and the objective lens 10 so that the second +primary light shows almost zero aberration to the information surface of the DVD medium 34.

The lens holder 11 so holds the nonpolarizing hologram element 36 and the objective lens 10 as to keep the hologram element 36 and the objective lens 10 across a given gap. The lens holder 11 has the aperture limiting portion 18, which provides the laser converging apparatus 35 with the limited NA 0.85 (first area) adapted to the Blu-ray medium 20. The nonpolarizing hologram element 36 and the objective lens 10 are fixed to the lens holder 11 by ordinary means of gluing or known techniques of anchoring or fitting.

The objective lens 10 has the NA 0.85 and corresponds to the Blu-ray medium 20. The objective lens 10 so converges the zero order light and permeated light from the nonpolarizing hologram element 36 that the zero order light and permeated light show almost zero aberration to the information surface of the Blu-ray medium 20. Also, the objective lens 10 so converges the first +primary light from the nonpolarizing hologram element 36 that the first +primary light shows almost zero aberration to the information surface of the HD DVD medium 21. Further, the objective lens 10 so converges the second +primary light from the nonpolarizing hologram element 36 that the second +primary light shows almost zero aberration to the information surface of the DVD medium 34.

=Operation of the Optical Pickup Device to which the Laser Converging Apparatus Applies=

The following is a description of the operation of the laser converging apparatus 35 and the optical pickup device to which the laser converging apparatus 35 applies according to the present invention. The description will be made referring to FIGS. 11, 13, 20, 21. The operation of the optical pickup device in application to the Blu-ray medium 20 and the HD DVD medium 21 is the same as described in the second embodiment, and, therefore, is not described further in the following.

The DVD medium 34 is an optical disk medium conforming to the DVD standard specifying the protective layer thickness of 0.6 mm. The DVD medium 34, like the Blu-ray medium 20 and the HD DVD medium 21, is held with the chucking mechanism on the front end of the disk motor (no drawing is given), which revolves the DVD medium 34 at a given linear velocity (or angular velocity).

When the optical pickup device starts operating, the LD driving circuit 2 applies a control voltage to the blue-violet semiconductor laser 23, which in response emits the blue-violet laser light having the wavelength of 400 to 410 nm onto the collimator lens 3. The blue-violet laser light turns into parallel light while passing through the collimator lens 3, and proceeds further to the dichroic mirror 39, then passes through the dichroic mirror 39 to fall on the mirror 40. The blue-violet laser light is reflected by the mirror 40 to fall on the nonpolarizing hologram element 36. The incident blue-violet laser light falling into the NA0.65 area (second area) of the nonpolarizing hologram element 36 is diffracted into zero order light and ∓primary light by the first nonpolarizing hologram pattern, as in the case of the second embodiment, and the zero order light is emitted onto the second nonpolarizing hologram pattern (see the single-dot chain lines in FIG. 11). Meanwhile, the blue-violet laser light falling into the part of the NA0.85 area other than the NA0.65 area of the nonpolarizing hologram element 36 permeates nonpolarizing hologram element 36 to become the permeated laser light, and is emitted onto the second nonpolarizing hologram pattern (see the broken lines shown in FIG. 11). Since the depth of the second nonpolarizing hologram pattern is integer times the value given by [wavelength of blue-violet laser light (400 to 410 nm)/(refractive index of nonpolarizing hologram element 36-1)], the zero order light and the permeated laser light pass through the nonpolarizing hologram element 36 without being diffracted by the second nonpolarizing hologram pattern, and falls on the objective lens 10. The zero order light and permeated laser light are then converged by the objective lens 10, and are emitted onto the DVD medium 34. Likewise, the first +primary light is converged by the objective lens 10, and is emitted onto the DVD medium 34.

In this case, however, a spherical aberration occurs because the Blu-ray medium 20 and the DVD medium 34 have different protective layer thicknesses. In addition, since the DVD medium 34 is designed for use with the red laser light having the wavelength of 650 to 660 nm, a color aberration or the like results when the first +primary light having the wavelength of 400 to 410 nm is projected on the DVD medium 34. The LD driving circuit 2 and the LD driving circuit 31 receive information indicating the occurrence of the aberration or the like. This information indicating the occurrence of the aberration or the like, for example, represents the information that the optical detector or the like (no drawing) detects when it receives the zero order light and permeated laser light and/or first +primary light that are projected on the information surface of the DVD medium 34 to cause the aberration or the like. Upon receiving the information, the LD driving circuit 2 stops applying the control voltage to the blue-violet semiconductor laser 23, while the LD driving circuit 31 applies the control voltage to the semiconductor laser 37. A series of operations up to the application of the control voltage to the semiconductor laser 37 is described as merely an instance, and do not exclude other options. For example, the optical pickup device may be provided with the mode changeover switch that has the Blu-ray medium 20 mode, the HD DVD medium 21 mode, the DVD medium 34 mode, etc. In this case, for example, a user manually operates the mode changeover switch and switches on a desired mode to make the LD driving circuit 31 apply the control voltage to the semiconductor laser 37 upon startup of the optical pickup device.

Responding to the control voltage, the semiconductor laser 37 emits the red laser light having the wavelength of 650 to 660 nm onto the collimator lens 38 for red color. The red laser light turns into parallel light while passing through the collimator lens 38, and proceeds to the dichroic mirror 39. The red laser light is then reflected by the dichroic mirror 39 to fall on the mirror 40, and is reflected again by the mirror 40 to fall on the nonpolarizing hologram element 36.

Since the depth of the first nonpolarizing hologram pattern of the nonpolarizing hologram element 36 is integer times the wavelength of 650 to 660 nm of the red laser light, the red laser light passes through the nonpolarizing hologram element 36 without being diffracted by the first nonpolarizing hologram pattern, and falls on the second nonpolarizing hologram pattern. On the other hand, the depth of the second nonpolarizing hologram pattern is not integer times the value given by [wavelength of red laser light (650 to 660 nm)/ (refractive index of nonpolarizing hologram element 36-1)], the red laser light in the NA0.60-0.65 area is diffracted into the zero order light and +primary light by the second nonpolarizing hologram pattern, and is emitted on the objective lens 10. The second +primary light is then so converged by the objective lens 10 as to show almost no aberration to the information surface of the DVD medium 34. As a result, the converged second +primary light is projected on the information surface of the DVD medium 34 to execute recording and reproduction on the DVD medium 34 in a fine manner.

While the second nonpolarizing hologram pattern having the section of stepped blaze shape is used in this embodiment, the sectional shape to be adopted is not limited to this shape. For example, such rectangles are also applicable that the rectangles have a depth d in the direction of optical axis of the zero order light, permeated laser light, and first +primary light that is integer times the value given by [wavelength of zero order light, permeated laser light, and first +primary light (400 to 410 nm)/(refractive index of nonpolarizing hologram element 36-1)]. The reason for using the stepped blaze shape in this embodiment is that the second nonpolarizing hologram pattern having the section of stepped blaze shape shows greater efficiency in diffracting the second +primary light, thus transmits the zero order light, permeated laser light, and first +primary light without fail. Likewise, the first nonpolarizing hologram pattern can be formed selectively to have a section of rectangles or stepped blaze shape.

The flare light having passed through the part of the NA 0.85 area other than the NA 0.65 area is not converged onto the information surface of the HD DVD medium 21 as shown in FIG. 6 of the first embodiment. The flare light, therefore, flares widely relative to the size of the optical detector when an optical magnification for an outward path from the information surface of the HD DVD medium 21 to the optical detector is larger than a given magnification, thus most part of the flare light does not fall on the detector. This ensures that the flare light does not have an effect (a decline in the signal-to-noise ratio of signals from the information surface, a change in the waveforms of servo signals obtained from the signals, etc.) on recording and reproduction operation on the HD DVD medium 21. On the other hand, when an optical magnification for a return path is smaller than a given magnification due to such a limitation as the size of the optical system, the flare light may have an effect on recording and reproduction operation on the HD DVD medium 21. To prevent that from happening, a diffusion hologram pattern, which functions in the same way as the diffusion hologram pattern according to the first embodiment, is formed in the part of the NA 0.85 area other than the NA 0.65 area. As a result, the blue-violet laser light is diffracted by this diffusion hologram pattern into, for example, zero order light and ∓primary light, and is converged into a location separated from the information surface of the HD DVD medium 21 by a given distance or more. Hence the flare light comes to have less effect.

The red laser light having passed through the part of the NA 0.85 area other than the NA 0.60-0.65 area (hereinafter referred to as red flare light) is not converged onto the information surface of the DVD medium 34. The red flare light, therefore, flares widely relative to the size of the optical detector when an optical magnification for an outward path from the information surface of the DVD medium 34 to the optical detector is larger than a given magnification, thus most part of the red flare light does not fall on the optical detector. This ensures that the red flare light does not have an effect (a decline in the signal-to-noise ratio of signals from the information surface, a change in the waveforms of servo signals obtained from the signals, etc.) on recording and reproduction operation on the DVD medium 34. On the other hand, when an optical magnification for a return path is smaller than a given magnification due to such a limitation as the size of the optical system, the red flare light may have an effect on recording and reproduction operation on the DVD medium 34. To prevent that from happening, a diffusion hologram pattern is formed on one surface of the nonpolarizing hologram element 36 that has the second nonpolarizing hologram pattern (see FIG. 21) in the part of the NA0.85 area other than the NA 0.60-0.65 area. This diffusion hologram pattern is so formed as to converge the red flare light into a location separated from the information surface of the DVD medium 34 by a given distance or more. As a result, the red laser light is diffracted by the diffusion hologram pattern into, for example, zero order light and +primary light, and is converged into the location separated from the information surface of the DVD medium 34 by the given distance or more. Hence the red flare light comes to have less effect.

According to the laser converging apparatus 36, though the first nonpolarizing hologram pattern and the second nonpolarizing hologram pattern are arranged in increasing order in the incident direction of the blue-violet laser light, other arrangement is also possible. The first nonpolarizing hologram pattern and the second nonpolarizing hologram pattern may be arranged in decreasing order in the incident direction of the blue-violet laser light. In this case, the first nonpolarizing hologram pattern is so formed as to correspond to the distance between the first nonpolarizing hologram pattern and the objective lens 10 so that the first nonpolarizing hologram pattern makes the aberration of the first +primary light almost zero to the information surface of the HD DVD medium 21. Likewise, the second nonpolarizing hologram pattern is so formed as to correspond to the distance between the second nonpolarizing hologram pattern and the objective lens 10 so that the second nonpolarizing hologram pattern makes the aberration of the second +primary light almost zero to the information surface of the DVD medium 34.

This embodiment enables the convergence of the permeated laser light and zero order light that have permeated the part of the NA0.85 area other than the NA0.65 area onto the information surface of the Blu-ray medium 20, the convergence of the first +primary light from the first nonpolarizing hologram pattern in the NA0.65 area onto the information surface of the HD DVD medium 21, and the convergence of the second +primary light from the second nonpolarizing hologram pattern in the NA0.60-0.65 area onto the information surface of the DVD medium 34. According to the embodiment, therefore, one objective lens 10 is capable of serving for recording and reproduction on both optical disk media (Blu-ray medium 20 and HD DVD medium 21), to which the laser light of the same wavelength (400 to 410 nm) is used and which have different protective layer thicknesses, and on an optical disk medium (DVD medium 34), to which the laser light of a different wavelength (650 to 660 nm) is used.

According to this embodiment, the section of the first nonpolarizing hologram pattern is made into the rectangles whose depth in the direction of optical axis of the red laser light is given by [wavelength of red laser light/(refractive index of nonpolarizing hologram element 36−1], or into the stepped blaze shape having the depth of each step in the above direction of the optical axis that is integer times the value given by [wavelength of red laser light/(refractive index of nonpolarizing hologram element 36−1]. As a result, the first nonpolarizing hologram pattern can transmit the red laser light without diffracting it, and diffract the blue-violet laser light without fail. In addition, the section of the second nonpolarizing hologram pattern is made into the rectangles whose depth in the direction of optical axis of the zero order light, permeated laser light, and first +primary light is integer times the value given by [wavelength of zero order light, permeated laser light, and first +primary light/(refractive index of nonpolarizing hologram element 36−1], or made into the stepped blaze shape having the depth of each step in the above direction of the optical axis that is integer times the value given by [wavelength of zero order light, permeated laser light, and first +primary light/(refractive index of nonpolarizing hologram element 36−1]. As a result, the second nonpolarizing hologram pattern can transmit the zero order light, permeated laser light, and first +primary light without diffracting them, and diffract the red laser light without fail.

Also, the diffusion hologram pattern can diffract the incident blue-violet laser light falling into the part of the NA0.85 area other than NA0.65 area into zero order light and ∓primary light. This reduces the effect of the flare light on recording and reproduction on the HD DVD medium 21.

The embodiment thus provides the optical pickup device that comprises the blue-violet semiconductor laser 23 that emits the blue-violet laser light, the semiconductor laser 37 that emits the red laser light, and the laser converging apparatus 35 that can be used for both optical disk media (Blu-ray medium 20 and HD DVD medium 21), to which the laser light of the same wavelength (400 to 410 nm) is used and which have different protective layer thicknesses, and also for an optical disk medium (DVD medium 34), to which the laser light of a different wavelength (650 to 660 nm) is used and which has a different protective layer thickness.

The above description of the third and fourth embodiments relates to the laser converging apparatuses 29, 35 and the optical pickup devices to which the laser converging apparatuses 29, 35 apply, in application to the DVD medium 34. The laser converging apparatuses 29, 35 and the optical pickup devices are also applicable to other media than the DVD medium 34, such as an optical disk medium conforming to the CD standard (hereinafter referred to as CD medium), in other embodiments.

In such an embodiment, the semiconductor laser 32 (37) is replaced with a semiconductor laser that emits infrared laser having a wavelength of 780 to 790 nm corresponding to the CD medium (with a protective layer of 1.2 mm). In addition, a hologram pattern corresponding to the CD medium is formed in an NA0.45-0.50 area of the nonpolarizing hologram element 33 (nonpolarizing hologram element 36). This hologram pattern diffracts the infrared laser light into, for example, zero light and ∓primary light, and transmits blue-violet laser light. In other words, the hologram pattern is so optimized as to transmit the blue-violet laser light and, for example, make the aberration of the +primary light zero to the information surface of the CD medium. This means that the hologram pattern is determined unconditionally by such a factor as a gap between the nonpolarizing hologram element 33 (36) and the objective lens 10. In this embodiment, the laser converging apparatuses 29, 35 and the optical pickup devices operate as in the case of the third and fourth embodiments to enable fine recording and reproduction on the CD medium.

While the description of the above embodiments relates to the laser converging apparatuses and the optical pickup devices to which the laser converging apparatuses apply, an optical disk recording/reproducing apparatus equipped with the laser converging apparatus or the optical pickup device is also capable of the operation and effects that are explained in the above embodiments.

The description concerning the laser converging apparatuses and the optical pickup devices is made heretofore to facilitate understanding of the present invention, and is not made to limit the scope of the present invention. The present invention can be modified or improved without departing from the spirit of the invention, and encompasses equivalents to the present invention.

What is claimed is:

1. A laser converging apparatus comprising:
a polarizing hologram element having a first area defined by a numerical aperture corresponding to a thickness of a first protective layer of a first disk medium and a second area inside the first area, the second area defined by a numerical aperture corresponding to a thickness of a second protective layer of a second disk medium, the thickness of the second protective layer being greater than the thickness of the first protective layer, the second area having a hologram pattern for transmitting first laser light linearly polarized in a first direction without diffracting the first laser light while diffracting and transmitting second laser light that is linearly polarized in a second direction crossing the first direction, the second laser light having the same wavelength as the first laser light;
an objective lens having the numerical aperture corresponding to the thickness of the first protective layer, the objective lens converging the first laser light having passed through the first area including the second area onto an information surface on one side of the first protective layer, the objective lens converging the second laser light having passed through the second area onto an information surface on one side of the second protective layer; and
a holder that holds the polarizing hologram element and the objective lens.

2. The laser converging apparatus according to claim 1, wherein the polarizing hologram element has a diffusion hologram pattern in a part of the first area other than the second area, the diffusion hologram pattern transmitting the first laser light without diffracting the first laser light and diffracting the second laser light so that the second laser light having passed through the part of the first area other than the second area is not converged onto the information surface on one side of the second protective layer.

3. The laser converging apparatus according to claim 1, wherein the hologram pattern has a sectional shape in a direction of optical axis of the second laser light, the sectional shape being a serration having substantially linear or stepped slopes.

4. An optical disk recording/reproducing apparatus mounted with the optical pickup device according to claim 3.

5. An optical pickup device comprising:
a semiconductor laser that emits a first laser light polarized linearly in a first direction;
a polarizing direction switching element that transmits the first laser light while maintaining a polarizing direction of the first laser light or that transmits a second laser light created by turning the polarizing direction of the first laser light to a second direction crossing the first direction; and
a laser converging assembly including:
a polarizing hologram element having a first area defined by a numerical aperture corresponding to a thickness of a first protective layer of a first disk medium and a second area inside the first area, the second area defined by a numerical aperture corresponding to a thickness of a second protective layer of a second disk medium, the thickness of the second protective layer being greater than the thickness of the first protective layer, the second area having a hologram pattern for transmitting the first laser light without diffracting the first laser light while diffracting and transmitting the second laser light;
an objective lens having the numerical aperture corresponding to the thickness of the first protective layer, the objective lens converging the first laser light having passed through the first area including the second area onto an information surface on one side of the first protective layer, the objective lens converging the second laser light having passed through the second area onto an information surface on one side of the second protective layer; and
a holder that holds the polarizing hologram element and the objective lens.

6. The optical pickup device according to claim 5, wherein the polarizing direction switching element is a liquid crystal element.

* * * * *